(12) United States Patent
Gupta et al.

(10) Patent No.: US 12,084,571 B2
(45) Date of Patent: Sep. 10, 2024

(54) CURABLE COMPOSITIONS BASED ON MULTISTAGE POLYMERS

(71) Applicant: Arkema France, Colombes (FR)

(72) Inventors: Manjuli Gupta, Easton, PA (US); Lucile Bonhoure, Paris (FR)

(73) Assignee: Arkema France, Colombes (FR)

( * ) Notice: Subject to any disclaimer, the term of this patent is extended or adjusted under 35 U.S.C. 154(b) by 571 days.

(21) Appl. No.: 17/253,852

(22) PCT Filed: May 7, 2019

(86) PCT No.: PCT/EP2019/061740
§ 371 (c)(1),
(2) Date: Dec. 18, 2020

(87) PCT Pub. No.: WO2020/001835
PCT Pub. Date: Jan. 2, 2020

(65) Prior Publication Data
US 2021/0171760 A1    Jun. 10, 2021

Related U.S. Application Data

(60) Provisional application No. 62/690,092, filed on May 7, 2019.

(51) Int. Cl.
*C08L 51/04* (2006.01)
*B29C 64/124* (2017.01)
(Continued)

(52) U.S. Cl.
CPC ............ *C08L 51/04* (2013.01); *B29C 64/124* (2017.08); *B33Y 10/00* (2014.12); *C08F 220/282* (2020.02); *C08F 222/102* (2020.02); *C08F 222/103* (2020.02); *C08F 285/00* (2013.01); *C08F 290/067* (2013.01);
(Continued)

(58) Field of Classification Search
CPC ......................... C08F 285/00; C08F 222/102; C08F 222/103; C08F 220/282; C08F 290/067; C08L 51/04; C08L 75/16; C08L 71/02
See application file for complete search history.

(56) References Cited

U.S. PATENT DOCUMENTS 6,287,745 B1   9/2001   Yamamura et al.
8,207,239 B2   6/2012   Takase et al.
(Continued)

FOREIGN PATENT DOCUMENTS

EP    3315522 A1   10/2016
EP    3260279 A1    6/2017
(Continued)

*Primary Examiner* — Marc S Zimmer
*Assistant Examiner* — Surbhi M Du
(74) *Attorney, Agent, or Firm* — Christopher R. Lewis, Esq.

(57) ABSTRACT

Compositions which are curable by, for example, exposure to radiation to form useful articles such as three-dimensionally printed objects are prepared using multistage polymers, polymerizing organic substances and (meth)acrylic polymers. The multistage polymer is effective to toughen and impact modify the cured articles, yet the compositions prior to curing are relatively low in viscosity and agglomerate content even at high loadings of multistage polymer.

18 Claims, 8 Drawing Sheets

(51) Int. Cl.
    *B29K 33/00*     (2006.01)
    *B33Y 10/00*     (2015.01)
    *C08F 220/28*     (2006.01)
    *C08F 222/10*     (2006.01)
    *C08F 285/00*     (2006.01)
    *C08F 290/06*     (2006.01)
    *C08L 71/02*     (2006.01)
    *C08L 75/16*     (2006.01)
    *C09D 151/04*     (2006.01)
    *C09J 151/04*     (2006.01)

(52) U.S. Cl.
    CPC ............... *C08L 71/02* (2013.01); *C08L 75/16* (2013.01); *C09D 151/04* (2013.01); *C09J 151/04* (2013.01); *B29K 2033/00* (2013.01)

(56) References Cited

U.S. PATENT DOCUMENTS

| | | |
|---|---|---|
| 9,676,899 B2 | 6/2017 | Steeman et al. |
| 2009/0014600 A1 | 1/2009 | Mannhart |
| 2012/0295077 A1 | 11/2012 | Ficek et al. |
| 2015/0376437 A1* | 12/2015 | Hoess ................ C09D 125/14 524/379 |
| 2017/0055629 A1 | 3/2017 | Schickling |
| 2018/0290377 A1* | 10/2018 | Talken ................ C08F 220/34 |
| 2018/0291219 A1 | 10/2018 | Kiyosada |
| 2020/0172649 A1 | 6/2020 | Hajji et al. |

FOREIGN PATENT DOCUMENTS

| | | |
|---|---|---|
| JP | 2006002110 A2 | 1/2006 |
| WO | WO2011075555 A1 | 6/2011 |
| WO | 2012126695 A1 | 9/2012 |
| WO | WO2014126830 A2 | 8/2014 |
| WO | WO14168173 A1 | 10/2014 |
| WO | 2016102666 A1 | 6/2016 |
| WO | 2016102682 A1 | 6/2016 |
| WO | WO2017044381 A1 | 3/2017 |
| WO | 2017121749 A1 | 7/2017 |
| WO | 2017220791 A1 | 12/2017 |
| WO | 2018002259 A1 | 1/2018 |
| WO | 2018002260 A1 | 1/2018 |
| WO | 2018002273 A1 | 1/2018 |
| WO | 2018102658 A1 | 6/2018 |
| WO | 2019012088 A1 | 1/2019 |

\* cited by examiner

MSP+P1 dispersed in PEGDMA

CURABLE COMPOSITIONS BASED ON MULTISTAGE POLYMERS

CROSS-REFERENCE TO RELATED APPLICATIONS

This application is a U.S. national stage application under 35 U.S.C. § 371 of international application number PCT/EP2019/061740, filed May 7, 2019, which claims priority to U.S. patent application No. 62/690,092, filed Jun. 26, 2018.

FIELD OF THE INVENTION

The present invention relates to curable compositions which, in uncured form, can be free-flowing, well-dispersed, relatively low viscosity liquids at room temperature and which are capable of being cured to provide articles with enhanced toughness and impact properties.

BACKGROUND OF THE INVENTION

Acrylic resin formulations based on curable (meth)acrylate-functionalized monomers and typically cured by free radical polymerization mechanisms have been known for some time. Once cured, such formulations generally provide articles having high modulus and strength. However, these cured materials are usually brittle and consequently have a low ability to withstand impact. Modifying such a formulation so that it has, in cured form, increased impact resistance and toughness while at the same time maintaining its desirable high modulus and strength properties has proven to be challenging, despite the commercial potential of such a modified system. Typically, the problem encountered when incorporating toughening additives into curable acrylic systems is that the rigidity and strength are compromised when impact strength and/or toughness are increased by the addition of toughening additives. Additionally, many additives that potentially could be used as tougheners or impact modifiers can only be included at low levels, if at all, in such acrylic systems due to their incompatibility with (meth)acrylate-functionalized monomers and oligomers. That is, conventional tougheners and impact modifiers typically do not disperse well in such monomers and oligomers and/or result in gelling or significant viscosity increases of the acrylic system. The development of curable compositions which have reduced problems with viscosity, sedimentation (settling) and gelling as a consequence of the presence of impact modifiers/tougheners and yet are capable of being cured to provide articles having improved toughness and impact resistance without significant compromise in strength and modulus properties would be highly desirable.

SUMMARY OF THE INVENTION

It has now been discovered that the use of a multistage polymer in combination with a (meth)acrylic polymer (P1) permits the formulation of curable compositions based on one or more polymerizing organic substances which are well-dispersed, stable liquids having sufficiently low viscosities at ambient or moderately elevated temperatures to facilitate their handling and use in forming operations such as coatings, adhesives and three-dimensional printing. For example, the inclusion of the (meth)acrylic polymer (P1) component helps to ensure good dispersion of the multistage polymer in the liquid matrix of the polymerizing organic substance(s). Selecting polymerizing organic substances based on their compatibility with the multistage polymer has also been found to play a role in achieving a curable composition having suitable characteristics. Such curable compositions may be cured using methods such as photocuring to provide cured articles having a remarkable balance of properties, e.g., good toughness and impact resistance without significantly compromising mechanical properties such as tensile strength and modulus.

Thus, in one aspect of the invention, a curable composition is provided which is comprised of, consists essentially of, or consists of component (a), component (b), component (c), and optionally component (d), wherein:
  a) component (a) is one or more multistage polymers;
  b) component (b) is one or more (meth)acrylic polymers (P1);
  c) component (c) is one or more polymerizing organic substances; and
  d) optional component (d) is one or more photoinitiators.

In a further aspect of the invention, a method of making a cured article, such as a three-dimensional article, a coating, a sealant or an adhesive, is provided. The method comprises, consists essentially of or consists of curing a curable composition comprising, consisting essentially of or consisting of component (a), component (b), and component (c), wherein:
  a) component (a) is one or more multistage polymers;
  b) component (b) is one or more (meth)acrylic polymers (P1); and
  c) component (c) is one or more monomeric polymerizing organic substances;
  and wherein the curable composition is cured by exposing the curable composition to radiation (such as actinic radiation, including UV or visible light). More particularly a curable composition comprising components (a), (b) and (c) without a photoinitiator is suitable for EB (electron-beam) cure.

The curable compositions of the present invention are particularly useful as resins in fabricating articles which are 3D printed, including by both layer-by-layer and continuous three-dimensional printing methods.

DETAILED DESCRIPTION OF EMBODIMENTS OF THE INVENTION

Multistage Polymers

Figure 1:
FIGS. 1 to 8 depict various experimental results, as explained in detail in the Examples.
Figure 1:
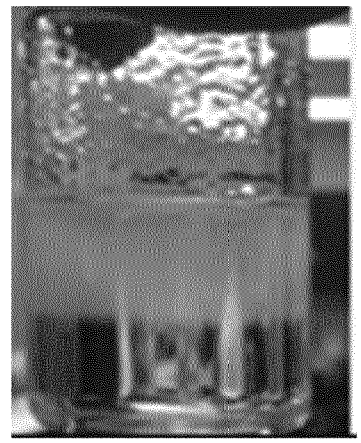
Figure 1:

Component (a) of the curable composition of the present invention comprises, consists essentially of or consists of one or more multistage polymers. The term "multistage polymer", as used herein, refers to a polymer formed in sequential fashion by a multistage polymerization process. Preferred is a multi-stage emulsion polymerization process in which the first polymer formed in the process is a first-stage polymer and the second polymer formed in the process is a second-stage polymer, i.e., the second polymer is formed by emulsion polymerization in the presence of the first emulsion polymer.

According to certain embodiments of the invention, at least portions of the multistage polymer(s) and the (meth)acrylic polymer(s) (P1) are provided to the curable composition in combined form. For example, all or part of component (a) and all or part of component (b) of the curable composition may initially be supplied, when formulating the curable composition, in the form of a polymer composition (which may be in the form of particles) which comprises at least one multistage polymer and at least one (meth)acrylic polymer (P1). For example, the (meth)acrylic polymer (P1) may be formed as an additional stage when preparing the multistage polymer, as will be described in more detail hereafter. The invention is not necessarily restricted in this way, however, and all or part of component (b) may be supplied to the curable composition separate and apart from the multistage polymer, i.e., as a discrete ingredient.

Without wishing to be bound by any particular theory, it is believed that in certain embodiments of the invention in which the multistage polymer and (meth)acrylic polymer (P1) are supplied together as part of such a polymer composition wherein the (meth)acrylic polymer is deposited on the outer surface of a multistage polymer having a core/shell structure, with at least a portion of the (meth)acrylic polymer (P1) not grafted to the multistage polymer, once combined with the other components of the curable composition (in particular, the polymerizing organic substance(s) of component (c)) at least a portion of the (meth)acrylic acid becomes disassociated from such outer surface and becomes at least partially solubilized in component (c), thereby helping to disperse the multistage polymer and reduce agglomeration and/or settling out of the multistage polymer.

The following patent applications, each of which is incorporated herein by reference in its entirety for all purposes, describe multistage polymers suitable for use in the present invention: WO 2016/102666; US 2017/0369696; WO 2017/121749; WO 2017/121750; WO 2017/220791; WO 2018/002259; WO 2018/002260; WO 2018/002273; FR 17 56649; and FR 17 56647.

The multistage polymers suitable for use in the present invention have at least two stages that are different in their polymer composition. The multistage polymer (which in certain preferred embodiments is prepared or supplied in combination with the (meth)acrylic polymer(s) (P1) of component (b)) is preferably in form of polymer particles, which typically are spherical particles. These particles may also be referred to as core/shell particles. The first stage forms the core, the second or all following stages the respective shells. Such a multistage polymer which is also a core/shell particle is preferred.

With regard to the individual particles of multistage polymer (or particles of multistage polymer together with (meth)acrylic polymer (P1), in embodiments where the (meth)acrylic polymer (P1) is produced as a further stage during production of the multistage polymer) which may be referred to herein as "polymer particles," they may generally have a weight average particle size between 15 nm and 900 nm. Preferably, the weight average particle size (diameter) of such polymer particles is between 20 nm and 800 nm, more preferably between 25 nm and 600 nm, still more preferably between 30 nm and 550 nm, again still more preferably between 35 nm and 500 nm, advantageously between 40 nm and 400 nm, even more advantageously between 75 nm and 350 nm and advantageously between 80 nm and 300 nm. Such polymer particles can be agglomerated giving a polymer powder comprising either the multistage polymer or the (meth)acrylic polymer (P1) and the multistage polymer.

According to certain embodiments, the particles of polymer powder (agglomerated polymer particles) may have a volume median particle size D50 between 1 μm and 500 μm. Preferably, the volume median particle size is between 10 μm and 400 μm, more preferably between 15 μm and 350 μm and advantageously between 20 μm and 300 μm. The D10 of the particle size distribution in volume is preferably at least 7 μm and more preferably at least 10 μm. The D90 of the particle size distribution in volume is preferably at most 500 μm, more preferably at most 400 μm, and most preferably at most 250 μm.

The multistage polymer may be obtained by a multistage process such as a process comprising two, three or more stages. According to certain embodiments, the multistage polymer has a multilayer structure comprising at least one layer (A) comprising a polymer (A1) having a glass transition temperature below 10° C. (e.g., below 0° C.) and another layer (B) comprising a polymer (B1) having a glass transition temperature of at least 30° C.

In a first preferred embodiment, the polymer (B1) having a glass transition temperature of at least 30° C. is the external layer of the polymer particle having the multilayer structure.

In a second preferred embodiment, the polymer (B1) having a glass transition temperature of at least 30° C. is an intermediate layer of the polymer particle having the multilayer structure, before the multistage polymer is brought into contact with component (c) of the curable composition.

Preferably the stage (A) is the first stage and the stage (B) comprising polymer (B1) is grafted on stage (A) comprising polymer (A1) or another intermediate layer. By first stage is meant that the stage (A) comprising polymer (A1) is made before the stage (B) comprising polymer (B1).

The polymer (A1) having a glass transition temperature below 10° C. in the layer (A) is never made during the last stage of the multistage process. This means that the polymer (A1) is never in the external layer of the particle with the multilayer structure. The polymer (A1) having a glass transition temperature below 10° C. in the layer (A) is either in the core of the polymer particle or one of the inner layers.

Preferably the polymer (A1) having a glass transition temperature below 10° C. in the layer (A) is made in the first stage of the multistage process forming the core for the polymer particle having the multilayer structure and/or before the polymer (B1) having a glass transition temperature of at least 30° C. Preferably the polymer (A1) has a glass transition temperature below 0° C., −5° C., more preferably below −15° C., advantageously below −25° C.

In a first preferred embodiment, the polymer (B1) having a glass transition temperature of at least 30° C. is made in the last stage of the multistage process forming the external layer of the polymer particle having the multilayer structure.

In a second preferred embodiment the polymer (B1) having a glass transition temperature of at least 30° C. is an intermediate layer of the polymer particle having the multilayer structure, and is made in a stage after the stage for forming the polymer (A1) of the multistage process.

There could be additional intermediate layer or layers obtained by an intermediate stage or intermediate stages.

The glass transition temperatures ($T_g$) of the respective polymers can be estimated for example by dynamic methods as thermomechanical analysis. In order to obtain a sample of the respective polymers (A1) and (B1) they can be prepared alone, and not by a multistage process, for estimating and measuring more easily the glass transition temperature Tg individually of the respective polymers of the respective stages.

With regard to the polymer (A1), in a first embodiment it is a (meth)acrylic polymer comprising at least 50 wt % of monomers from alkyl acrylates (i.e., one or more alkyl acrylates comprise at least 50 wt % of the monomers polymerized into the (meth)acrylic polymer). More preferably the polymer (A1) comprises a comonomer or comonomers which are copolymerizable with alkyl acrylate, as long as polymer (A1) has a glass transition temperature of less than 0° C. The comonomer or comonomers in polymer (A1) are preferably selected from the group consisting of (meth) acrylic monomers and vinyl monomers. The (meth)acrylic comonomer(s) in polymer (A1) may comprise one or more monomers selected from the group consisting of C1 to C12 alkyl (meth)acrylates. Still more preferably, the (meth) acrylic comonomer(s) in polymer (A1) may comprise one or more C1 to C4 alkyl (meth)acrylates.

Most preferably, the acrylic or methacrylic comonomer(s) of polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) has a glass transition temperature of less than 10° C. (preferably less than 0° C.).

Preferably, polymer (A1) is crosslinked. This means that a crosslinker is present together with the other monomer or monomers. A crosslinker comprises at least two groups that can be polymerized, such as two or more (meth)acrylate groups.

In one specific embodiment, polymer (A1) is a homopolymer of butyl acrylate. In another specific embodiment, polymer (A1) is a copolymer of butyl acrylate and at least one crosslinker. The crosslinker may comprise less than 5 wt % of the copolymer.

More preferably, the glass transition temperature Tg of the polymer (A1) of the first embodiment is between −100° C. and 0° C., even more preferably between −100° C. and −5° C., advantageously between −90° C. and −15° C. and more advantageously between −90° C. and −25° C.

With regard to polymer (A1), in a second embodiment the polymer (A1) is a silicone rubber-based polymer such as a polyorganosiloxane. The silicone rubber, for example, may be polydimethyl siloxane. More preferably, the glass transition temperature ($T_g$) of the polymer (A1) of the second embodiment is between −150° C. and 0° C., even more preferably between −145° C. and −5° C., advantageously between −140° C. and −15° C. and more advantageously between −135° C. and −25° C.

With regard to polymer (A1), in a third embodiment the polymer (A1) having a glass transition temperature below 10° C. comprises at least 50 wt % of polymeric units coming from isoprene or butadiene (i.e., at least 50 wt % of the recurring units in polymer (A1) are polymerized units of isoprene or butadiene) and stage (A) is the inner-most layer of the polymer particle having the multilayer structure. In other words, stage (A) comprising the polymer (A1) is the core of the polymer particle.

By way of example, polymer (A1) of the core of the second embodiment may be selected from the group consisting of isoprene homopolymers, butadiene homopolymers, isoprene-butadiene copolymers, copolymers of isoprene with at most 98 wt % of a vinyl monomer, and copolymers of butadiene with at most 98 wt % of a vinyl monomer. The vinyl monomer may be styrene, an alkylstyrene, acrylonitrile, an alkyl (meth)acrylate, butadiene or isoprene. In one embodiment, the core comprises or is a butadiene homopolymer.

More preferably, the glass transition temperature ($T_g$) of polymer (A1) of the third embodiment comprising at least 50 wt % of polymeric units coming from isoprene or butadiene is between −100° C. and 0° C., even more preferably between −100° C. and −5° C., advantageously between −90° C. and −15° C. and even more advantageously between −90° C. and −25° C.

With regard to polymer (B1), mention may be made of homopolymers and copolymers comprising monomers with double bonds and/or vinyl monomers. Preferably, polymer (B1) is a (meth)acrylic polymer. However, if polymer (B1) is a (meth)acrylic polymer, it has a composition which is different from that of (meth)acrylic polymer (P1). Thus, polymer (B1) is a (meth)acrylic polymer which is different from the (meth)acrylic polymer (P1) of component (b). Preferably, polymer (B1) comprises at least 70 wt % of one or more monomers selected from the group consisting C1 to C12 alkyl (meth)acrylates. Still more preferably, polymer (B1) comprises at least 80 wt % of one or more monomers selected from the group consisting of C1 to C4 alkyl methacrylates and C1 to C8 alkyl acrylates.

Polymer (B1) can be crosslinked.

Most preferably, the acrylic or methacrylic monomer(s) employed in the preparation of polymer (B1) is or are selected from the group consisting of methyl acrylate, ethyl acrylate, butyl acrylate, methyl methacrylate, ethyl methacrylate, butyl methacrylate and mixtures thereof, as long as polymer (B1) has a glass transition temperature of at least 30° C. According to various embodiments of the invention, the monomer(s) used provide a polymer (B1) having a glass transition temperature of at least 40° C., at least 50° C. or at least 60° C.

Advantageously, polymer (B1) comprises at least 50 wt %, more advantageously at least 60 wt % and even more advantageously at least 70 wt % of monomer units coming from methyl methacrylate.

Preferably, the glass transition temperature ($T_g$) of polymer (B1) is between 30° C. and 150° C. The glass transition temperature of polymer (B1) is more preferably between 50° C. and 150° C., still more preferably between 60° C. and 150° C., still more preferably between 70° C. and 150° C., advantageously between 90° C. and 150° C. and more advantageously between 90° C. and 130° C. According to other preferred embodiments of the invention, the glass transition temperature of polymer (B1) is at least 40° C., at least 50° C., at least 60° C., at least 70° C., at least 80° C. or at least 90° C.

In another embodiment, the multistage polymer as described previously is prepared so as to include an additional stage, which provides (in whole or in part) the (meth)acrylic polymer (P1) which comprises component (b) of the curable composition. The primary polymer particle according to this embodiment of the invention has a multilayer structure comprising at least one stage (A) comprising a polymer (A1) having a glass transition temperature below 10° C., at least one stage (B) comprising a polymer (B1) having a glass transition temperature over 30° C. and at least one stage (P) comprising the (meth)acrylic polymer (P1) having a glass transition temperature between 30° C. and 150° C.

Preferably, the (meth)acrylic polymer (P1) is not grafted on any of the polymers (A1) or (B1). In other embodiments, at least a portion of (meth)acrylic polymer (P1) is not grafted on any of the polymers (A1) or (B1).

With regard to processes for manufacturing multistage polymers suitable for use as component (a) of the curable composition according to the invention, such a process may comprise the steps of:

a) polymerizing by emulsion polymerization a monomer or monomer mixture (Am) to obtain at least one layer (A) comprising polymer (A1) having a glass transition temperature of less than 10° C.; and b) polymerizing by emulsion polymerization a monomer or monomer mixture (Bm) to obtain layer (B) comprising a polymer (B1) having a glass transition temperature of at least 30° C.

The monomer or monomer mixture (Am) and the monomer or monomer mixture (Bm) are chosen from monomers according to the compositions for polymer (A1) and polymer (B1) described earlier.

Preferably, step a) is carried out before step b). More preferably, step b) is performed in presence of the polymer (A1) obtained in step a), if there are only two stages.

Advantageously, the process for manufacturing the multistage polymer composition to be employed in accordance with the invention is a multistep process comprising the steps one after the other of:
- a) polymerizing by emulsion polymerization a monomer or monomer mixture (Am) to obtain one layer (A) comprising polymer (A1) having a glass transition temperature of less than 10° C. (preferably less than 0° C.); and
- b) polymerizing by emulsion polymerization a monomer or monomer mixture (Bm) to obtain layer (B) comprising a polymer (B1) having a glass transition temperature of at least 30° C. (in another embodiment, at least 60° C.).

The respective monomers or monomer mixtures (Am) and (Bm) for forming the layers (A) and (B) respectively comprising the polymers (A1) and (B1) respectively and the characteristics of the respective polymers (A1) and (B1) are the same as defined before.

The process for manufacturing the multistage polymer can comprise additional steps for additional stages between the steps a) and b).

The process for manufacturing the multistage polymer can also comprise additional steps for additional stages before the steps a) and b). A seed could be used for polymerizing by emulsion polymerization the monomer or monomer mixture (Am) to obtain the layer (A) comprising polymer (A1) having a glass transition temperature of less than 10° C. The seed is preferably a thermoplastic polymer having a glass transition temperature of at least 20° C.

The multistage polymer may be obtained as an aqueous dispersion of polymer particles. The solid content of the dispersion may be between 10 wt % and 65 wt %, for example.

With regard to the process for manufacturing the (meth)acrylic polymer (P1) which may be component (b) of the curable composition of the present invention, such process may comprise the step of polymerizing the respective one or more (meth)acrylic monomers. The respective (meth)acrylic monomer(s) are the same as defined elsewhere herein for the (meth)acrylic polymer (P1) and two preferred embodiments of the (meth)acrylic polymer (P1).

The (meth)acrylic polymer (P1) (which may be a homopolymer or copolymer) could be made in a batch or semi-continuous process:
- for the batch process, the mixture of monomers may be introduced in one shot just before or after introduction of one or part of the initiator system;
- for the semi-continuous process, the monomer mixture may be added in multiple shots or continuously in parallel to the initiator addition (the initiator may also added in multiple shots or continuously) during a defined period of addition, which could be in the range 30 to 500 min.

The process for preparing a polymer composition comprising both a (meth)acrylic polymer (P1) (component (b)) and a multistage polymer (component (a)) has two preferred embodiments.

In a first preferred embodiment of the process, the (meth)acrylic polymer (P1) is prepared by polymerization of one or more suitable monomers in the presence of the multistage polymer. Thus, the (meth)acrylic polymer (P1) is made as an additional stage of the multistage polymer.

In a second preferred embodiment of the process, the (meth)acrylic polymer (P1) is polymerized apart from the multistage and subsequently mixed or blended with the multistage polymer.

With regard to the process according to the first preferred embodiment for preparing the polymer composition comprising the (meth)acrylic polymer (P1) and the multistage polymer, it may comprise the steps of:
- a) polymerizing by emulsion polymerization a monomer or monomer mixture (Am) to obtain one layer in stage (A) comprising polymer (A1) having a glass transition temperature of less than 10° C. (preferably less than 0° C.);
- b) polymerizing by emulsion polymerization a monomer or monomer mixture (Bm) to obtain layer in stage (B) comprising a polymer (B1) having a glass transition temperature of at least 30° C.; and
- c) polymerizing by emulsion polymerization a monomer or monomer mixture to obtain a layer in this additional stage comprising the (meth)acrylic polymer (P1) having a glass transition temperature of at least 30° C. (in one embodiment, at least 60° C.).

Preferably, step a) is performed before step b). More preferably, step b) is performed in presence of the polymer (A1) obtained in step a).

Advantageously the method for manufacturing a polymer composition comprising the (meth)acrylic polymer (P1) and the multistage polymer is a multistep process and comprises the steps of:
- a) polymerizing by emulsion polymerization a monomer or monomer mixture (Am) to obtain a layer in stage (A) comprising polymer (A1) having a glass transition temperature of less than 10° C. (preferably less than 0° C.);
- b) polymerizing by emulsion polymerization a monomer or monomer mixture (Bm) to obtain a layer in stage (B) comprising a polymer (B1) having a glass transition temperature of at least 30° C. (or at least 60° C., in certain embodiments); and
- c) polymerizing by emulsion polymerization a monomer or monomer mixture to obtain a layer in this additional stage comprising the (meth)acrylic polymer (P1) having a glass transition temperature of at least 30° C. (preferably, in a manner such that at least a portion or all of the (meth)acrylic polymer is not grafted to polymer (A1) or polymer (B1)).

The respective monomers or monomer mixture (Am) and (Bm) and the monomer(s) comprising the (meth)acrylic polymer) for forming the layers (A), (B) and additional stage respectively comprising the polymers (A1), (B1) and (meth)acrylic polymer (P1) respectively, are the same as defined before. The characteristics of the polymers (A1), (B1) and (meth)acrylic polymer (P1) respectively, are the same as defined elsewhere herein.

Preferably, the method for manufacturing the polymer composition comprising the (meth)acrylic polymer and the multistage polymer comprises the additional step d) of recovering the polymer composition. By recovering is meant partial or full separation between the aqueous and solid phase, wherein the latter phase comprises the polymer composition. More preferably, the recovering of the polymer composition is carried out by coagulation or by spray-drying. Spray drying is the preferred method for the recovering and/or drying step in the manufacturing method for a polymer powder composition useful as a source of the multistage polymer and optionally also (meth)acrylic polymer (P1) components of the curable compositions of the present invention if the polymer (A1) having a glass transition temperature below 10° C. comprises at least 50 wt % of polymeric units coming from alkyl acrylate and the stage (A) is the most inner layer of the polymer particle having the multilayer structure. Coagulation is the preferred method for the recovering and/or drying step in the manufacturing method for a polymer powder composition useful in the present invention if the polymer (A1) having a glass transition temperature below 10° C. comprises at least 50 wt % of polymeric units coming from isoprene or butadiene and the stage (A) is the most inner layer of the polymer particle having the multilayer structure.

The method for manufacturing a polymer composition useful as a source of the multistage polymer component and optionally also at least a portion of the (meth)acrylic polymer (P1) component employed in the curable compositions of the present invention can comprise optionally the additional step e) of drying of the polymer composition. Preferably, the drying step e) is performed if the step d) of recovering of the polymer composition is carried out by coagulation. Preferably, after the drying step e), the polymer composition comprises less than 3 wt %, more preferably less than 1.5 wt % advantageously less than 1% of water. The water content of a polymer composition can be measured using a thermo balance method. The drying of the polymer composition can be conducted in an oven, e.g., oven with heating of the composition for 48 hours at 50° C.

With regard to the process according to the second preferred embodiment for preparing the polymer composition comprising the (meth)acrylic polymer (P1) and the multistage polymer, such process may comprise the steps of:
 a) mixing the (meth)acrylic polymer (P1) and the multistage polymer; and
 b) recovering the mixture obtained in previous step in form of a polymer powder; wherein the (meth)acrylic polymer (P1) and the multistage polymer in step a) are in the form of a dispersion in an aqueous phase.

The quantities of the aqueous dispersion of the (meth)acrylic polymer (P1) and the aqueous dispersion of the multistage polymer may be selected in such a way that the weight ratio of the multistage polymer based on solid part only in the obtained mixture is at least 5 wt %, preferably at least 10 wt %, more preferably at least 20 wt % and advantageously at least 50 wt %.

The quantities of the aqueous dispersion of the (meth)acrylic polymer (P1) and the aqueous dispersion of the multistage polymer may be selected in such a way that the weight ratio of the multistage polymer based on solid part only in the obtained mixture is at most 99 wt %, preferably at most 95 wt % and more preferably at most 90 wt %.

The quantities of the aqueous dispersion of the (meth)acrylic polymer (P1) and the aqueous dispersion of the multistage polymer may be selected in such a way that the weight ratio of the multistage polymer based on solid part only in the obtained mixture is between 5 wt % and 99 wt %, preferably between 10 wt % and 95 wt % and more preferably between 20 wt % and 90 wt %.

The recovering step b) of the process for manufacturing the polymer composition comprising the (meth)acrylic polymer (P1) and the multistage polymer, preferably comprises coagulation or spray drying. The process for manufacturing the polymer composition comprising the (meth)acrylic polymer (P1) and the multistage polymer can optionally comprise an additional step c) of drying the polymer composition. By "dry" is meant that the polymer composition comprises less than 3 wt % water and preferably less than 1.5 wt % water and more preferably less than 1.2 wt % water. The water content can be measured by a thermo balance that heats the polymer composition and measures the weight loss.

The process for manufacturing the polymer composition comprising the (meth)acrylic polymer (P1) and the multistage polymer preferably yields a polymer powder. The polymer powder is in form of particles. A polymer powder particle comprises agglomerated primary polymer particles made by multistage process and the (meth)acrylic polymer (P1).

(Meth)Acrylic Polymers (P1)

Component (b) of the curable composition of the present invention consists of, consists essentially of or consists of one or more (meth)acrylic polymers (P1). As used herein, the term "(meth)acrylic polymer" means a polymer comprising one or more (meth)acrylic monomers (in polymerized form) wherein the (meth)acrylic monomer(s) make up 50 wt % or more of the (meth)acrylic polymer. The term "(meth)acrylic monomer," as used herein, means any type of polymerizable monomer containing one or more acrylic and/or methacrylic functional groups.

The (meth)acrylic polymers of component (b) may be the same composition as or different in composition from any (meth)acrylic polymer which may be present as part of the multistage polymer of component (a). Preferably, the (meth)acrylic polymers of component (b) is different in composition from any (meth)acrylic polymer which may be present as part of the multistage polymer of component (a).

The presence of (meth)acrylic polymer (P1) in the curable composition helps to facilitate the dispersion and stabilization of the multistage polymer, both in the curable composition and a cured article prepared therefrom. In the absence of the (meth)acrylic polymer (P1), the multistage polymer, which typically is in the form of particles, may tend to agglomerate and settle out of the curable composition (rendering the curable composition non-homogeneous). Thus, including the (meth)acrylic polymer (P1) has been found to lead to a homogeneous dispersion of the multistage polymer in the curable composition, which facilitates the formation of a homogeneous cured article prepared by curing the curable composition. An ideal homogeneous dispersion of the multistage polymer in a matrix has no agglomerates after the multistage polymer is combined with the polymerizing organic substance(s). Thus, a liquid curable composition comprising a (meth)acrylic polymer (P1), a multistage polymer and a polymerizing organic substance may possess or exhibit a better dispersion of the multistage polymer than an analogous composition not comprising the (meth)acrylic polymer. Further, a liquid curable composition comprising a (meth)acrylic polymer (P1), a multistage polymer and a polymerizing organic substance may be less viscous than an analogous composition not comprising the (meth)acrylic polymer.

The molecular weight of the (meth)acrylic polymer (P1) is not particularly limited and may be varied as may be needed or desired in order to impart certain characteristics or properties to the curable composition and/or cured articles prepared therefrom. The (meth)acrylic polymer (P1) may, for example, have a weight average molecular weight of from 2000 g/mol to 1,000,000 g/mol.

In a first more preferred embodiment the (meth)acrylic polymer (P1) has a weight average molecular weight (Mw) of at least 100,000 g/mol, preferably more than 100,000 g/mol, more preferably more than 105,000 g/mol, still more preferably more than 110,000 g/mol, advantageously more than 120,000 g/mol, more advantageously more than 130,000 g/mol and still more advantageously more than 140,000 g/mol.

The (meth)acrylic polymer (P1) may have a weight average molecular weight (Mw) below 1,000,000 g/mol, preferably below 900,000 g/mol, more preferably below 800,000 g/mol, still more preferably below 700,000 g/mol, advantageously below 600,000 g/mol, more advantageously below 550,000 g/mol and still more advantageously below 500,000 g/mol and most advantageously below 450,000 g/mol.

The weight average molecular weight (Mw) of the (meth)acrylic polymer (P1), according to the first preferred embodiment, is preferably between 100,000 g/mol and 1,000,000 g/mol, preferably between 105,000 g/mol and 900,000 g/mol, more preferably between 110,000 g/mol and 800,000 g/mol, advantageously between 120,000 g/mol and 700,000 g/mol, more advantageously between 130,000 g/mol and 600,000 g/mol, and most advantageously between 140,000 g/mol and 500,000 g/mol.

In a second more preferred embodiment the (meth)acrylic polymer (P1) has a weight average molecular weight Mw of less than 100,000 g/mol, preferably less than 90,000 g/mol, more preferably less than 80,000 g/mol, still more preferably less than 70,000 g/mol, advantageously less than 60,000 g/mol, more advantageously less than 50,000 g/mol and still more advantageously less than 40,000 g/mol.

In the second preferred embodiment, the (meth)acrylic polymer (P1) preferably has a weight average molecular weight (Mw) above 2000 g/mol, preferably above 3000 g/mol, more preferably above 4000 g/mol, still more preferably above 5000 g/mol, advantageously above 6000 g/mol, more advantageously above 6500 g/mol and even more advantageously above 7000 g/mol, still more advantageously above 10,000 g/mol and most advantageously above 12,000 g/mol.

The weight average molecular weight ($M_w$) of the (meth)acrylic polymer (P1) in the second preferred embodiment is preferably between 2000 g/mol and 100,000 g/mol, preferably between 3000 g/mol and 90,000 g/mol and more preferably between 4 000 g/mol and 80,000 g/mol, advantageously between 5000 g/mol and 70,000 g/mol, more advantageously between 6000 g/mol and 50,000 g/mol and most advantageously between 10,000 g/mol and 40,000 g/mol.

The weight average molecular weight ($M_w$) of the (meth)acrylic polymer (P1) may be selected according to the first more preferred embodiment or the second more preferred embodiment as a function of the acquired viscosity of the curable composition. If the viscosity has to be low or an additional rheology modifier is present, the second more preferred embodiment is preferred. If the viscosity has to be higher or no additional rheology modifier is present, the first more preferred embodiment is preferred.

According to preferred embodiments of the invention, the (meth)acrylic polymer (P1) comprises at least 50 wt %, at least 60 wt %, or at least 70 wt % of one or more monomers selected from the group consisting of C1 to C12 alkyl (meth)acrylates. Advantageously, the (meth)acrylic polymer (P1) may comprise at least 50 wt %, at least 60 wt %, at least 70 wt % or at least 80% of one or more monomers chosen from C1 to C4 alkyl methacrylate monomers, C1 to C8 alkyl acrylate monomers and mixtures thereof.

In certain embodiments, the glass transition temperature (Tg) of the (meth)acrylic polymer (P1) is 30° C. or higher, e.g., between 30° C. and 150° C. The glass transition temperature of the (meth acrylic polymer (P1) is more preferably between 40° C. and 150° C., advantageously between 45° C. and 150° C. and more advantageously between 50° C. and 150° C.

Preferably, the (meth)acrylic polymer (P1) is not cross-linked. According to preferred embodiments, the (meth)acrylic polymer (P1) is a thermoplastic polymer. The (meth)acrylic polymer (P1) may be a homopolymer or a copolymer, wherein "copolymer" refers to a polymer containing two or more different monomers in polymerized form. The term "thermoplastic polymer" as used herein means a polymer that turns to a liquid or becomes more liquid or less viscous when heated and that can take on new shapes by the application of heat and pressure. The (meth)acrylic polymer (P1) preferably is not grafted on any other polymer or polymers, or at least a portion of the (meth)acrylic polymer is not grafted on any other polymer or polymers.

In a first preferred embodiment, the (meth)acrylic polymer (P1) comprises (in polymerized form) from 50 wt % to 100 wt % methyl methacrylate, preferably from 80 wt % to 100 wt % methyl methacrylate, still more preferably from 80 wt % to 99.8 wt % methyl methacrylate and from 0.2 wt % to 20 wt % of a C1 to C8 alkyl acrylate monomer. Advantageously, the C1 to C8 alkyl acrylate monomer is selected from the group consisting of methyl acrylate, ethyl acrylate and butyl acrylate.

In a second preferred embodiment, the (meth)acrylic polymer (P1) comprises (in polymerized form) between 0 wt % and 50 wt % of one or more functional monomers. Preferably, the (meth)acrylic polymer (P1) comprises between 0 wt % and 30 wt % of the functional monomer(s), more preferably between 1 wt % and 30 wt %, still more preferably between 2 wt % and 30 wt %, advantageously between 3 wt % and 30 wt %, more advantageously between 5 wt % and 30 wt % and most advantageously between 5 wt % and 30 wt % of the functional monomer(s).

Preferably, the functional monomer of the second preferred embodiment is a (meth)acrylic monomer. The functional monomer(s) may have the formula (1) or (2):

wherein in both formulas (1) and (2), $R_1$ is selected from H or $CH_3$; and in formula (1) Y is O, $R_5$ is H or an aliphatic or aromatic radical having at least one atom that is not C or H; and in formula (2) Y is N and $R_4$ and $R_3$ are independently selected from H or an aliphatic or aromatic radical.

Preferably the functional monomer(s) is or are selected from the group consisting of glycidyl (meth)acrylate; (meth)acrylic acid; (meth)acrylamides such as, for example, dimethylacrylamide; 2-methoxyethyl (meth)acrylate; 2-aminoethyl (meth)acrylates (which may optionally be quaternized; (meth)acrylate monomers comprising a phosphonate or phosphate group; alkyl imidazolidinone (meth)acrylates, and polyethylene glycol (meth)acrylates and combinations thereof. Preferably, the polyethylene glycol group of a polyethylene glycol (meth)acrylate has a number average molecular weight ranging from 400 g/mol to 10,000 g/mol.

According to preferred embodiments of the invention, the (meth)acrylic polymer (P1) does not contain any functional groups capable of participating in the curing/polymerization which takes place when the curable composition is cured. In such embodiments, the (meth)acrylic polymer (P1) may be regarded as non-reactive.

Polymerizing Organic Substances

Component (c) of curable compositions in accordance with the present invention comprises, consists essentially of or consists of one or more polymerizing organic substances. As used herein, the term "polymerizing" means capable of participating in a polymerization or curing reaction to form a polymeric structure. The polymerizing organic substances may be monomeric and/or oligomeric in structure and may be characterized as containing one, two, three or more polymerizing functional groups per molecule. Suitable polymerizing functional groups include in particular functional groups capable of participating in chain-growth and ring-opening polymerization mechanisms, such as ethylenically and ethynically unsaturated functional groups (e.g., (meth)acryloyl, vinyl, olefinic and alkyne functional groups) and heterocyclic-functional groups (e.g., epoxide and oxetane functional groups). Polymerizing functional groups which polymerize via free radical and/or cationic mechanisms are particularly preferred. A polymerizing organic substance may include more than one type of polymerizing functional group. The molecular weight of suitable polymerizing organic substances is not particularly limited and may, for example, be from 120 to 10,000 g/mol or from 150 to 5,000 g/mol. Combinations of different polymerizing organic substances may be used as component (c) in the curable compositions of the present invention.

Preferably, component (c) is selected such that it is a liquid at least in the temperature range between 0° C. and 60° C.

Suitable illustrative types of polymerizing organic substances that may be mentioned include, but are not limited to, epoxides (oxiranes), oxetanes, oxolanes, cyclic acetals, and other cyclic ethers, cyclic lactones, vinyl compounds (both aliphatic and aromatic), (meth)acrylamides, and (meth)acrylates (which are particularly preferred). As used herein, the term "(meth)acrylate" refers to both acrylate (—O—C(=O)—CH=CH$_2$) and methacrylate (—O—C(=O)—C(CH$_3$)=CH$_2$) functional groups.

A polymerizing organic substance contains at least one moiety capable of participating in a polymerization or curing reaction whereby a plurality of polymerizing organic substance molecules become covalently bonded to each other to form a polymeric structure. Suitable reactive moieties include sites of ethylenic unsaturation (i.e., carbon-carbon double bonds, C=C). Such sites of ethylenic unsaturation can be provided, for example, by (meth)acryloyl, maleyl, allyl, propenyl, and/or vinyl groups. As used herein, the term "(meth)acryloyl" is intended to both include methacryloyl and acryloyl, as found in (meth)acrylates and (meth)acrylamides.

As previously mentioned, ethylenically unsaturated functional groups suitable for use in the present invention include groups containing at least one carbon-carbon double bond, in particular a carbon-carbon double bond capable of participating in a reaction (e.g., a free radical reaction) wherein at least one carbon of the carbon-carbon double bond becomes covalently bonded to an atom, in particular a carbon atom, in a second molecule. Such reactions may result in a polymerization or curing whereby the organic substance(s) containing one or more ethylenically unsaturated functional groups become(s) part of a polymerized matrix or polymeric chain. The carbon-carbon double bond may, for example, be present as part of an α,β-unsaturated carbonyl moiety, e.g., an α,β-unsaturated ester moiety such as an acrylate functional group (H$_2$C=CH—C(=O)O—) or a methacrylate functional group (H$_2$C=C(CH$_3$)—C(=O)O—). A carbon-carbon double bond may also be present in the ethylenically unsaturated functional group in the form of a vinyl group —CH=CH$_2$ or an allyl group, —CH$_2$—CH=CH$_2$.

In certain embodiments, the curable compositions of the present invention are further characterized by comprising, as at least part of component (c), at least one (meth)acrylate-functionalized organic substance. A (meth)acrylate-functionalized organic substance may be described as an organic substance bearing one or more (meth)acrylate functional groups per molecule. As used herein, the term "(meth)acrylate" refers to both acrylate and methacrylate functional groups. (Meth)acrylate-functionalized organic substances suitable for use in the present invention may be generally described as ethylenically unsaturated organic substances containing at least one carbon-carbon double bond alpha to an ester group (a compound containing at least one α,β-unsaturated ester moiety), in particular a carbon-carbon double bond capable of participating in a free radical reaction, in particular a reaction initiated by ultraviolet radiation or electron beam radiation. Such reactions may result in a polymerization or curing whereby the (meth)acrylate-functionalized organic substance becomes part of a polymerized matrix or polymeric chain. In various embodiments of the invention, the (meth)acrylate-functionalized organic substance may contain one, two, three, four, five or more (meth)acrylate functional groups per molecule. Combinations of multiple (meth)acrylate-functionalized organic substances containing different numbers of (meth)acrylate groups may be utilized in the curable compositions of the present invention.

The curable compositions of the present invention thus may contain one or more (meth)acrylate functionalized organic substances capable of undergoing free radical polymerization (curing) initiated by exposure to actinic radiation (e.g., ultraviolet light) or electron beam radiation. The (meth)acrylate-functionalized organic substances may be oligomers or monomers or a combination of oligomer(s) and monomer(s).

Any of the following types of (meth)acrylate-functionalized organic substances may, for example, be employed in the curable compositions of the present invention, possibly or optionally in combination with one or more other types of polymerizing organic substances as co-reactants: monomers such as (meth)acrylate esters of aliphatic mono-alcohols, (meth)acrylate esters of alkoxylated aliphatic mono-alcohols, (meth)acrylate esters of aliphatic polyols, (meth)acrylate esters of alkoxylated aliphatic polyols, (meth)acrylate esters of aromatic ring-containing alcohols, and (meth)acrylate esters of alkoxylated aromatic ring-containing alcohols; and oligomers such as epoxy (meth)acrylates, polyether (meth)acrylates, urethane (meth)acrylates, polyester (meth)acrylates (including amine- and sulfide-modified derivatives thereof); and combinations thereof.

Suitable (meth)acrylate-functionalized oligomers include, for example, polyester (meth)acrylates, epoxy (meth)acrylates, polyether (meth)acrylates, urethane (meth)acrylates (sometimes also referred to as polyurethane (meth)acrylates or urethane (meth)acrylate oligomers) and combinations thereof, as well as amine-modified and sulfide-modified variations thereof. Certain of these (meth)acrylate-functionalized oligomers may function as flexibilizers in the cured articles obtained by curing of the curable composition, i.e., their inclusion helps to increase the flexibility of the cured articles.

Exemplary polyester (meth)acrylates include the reaction products of acrylic or methacrylic acid or mixtures thereof with hydroxyl group-terminated polyester polyols. The reaction process may be conducted such that a significant concentration of residual hydroxyl groups remain in the polyester (meth)acrylate or may be conducted such that all or essentially all of the hydroxyl groups of the polyester polyol have been (meth)acrylated. The polyester polyols can be made by polycondensation reactions of polyhydroxyl functional components (in particular, diols) and polycarboxylic acid functional compounds (in particular, dicarboxylic acids and anhydrides). To prepare the polyester (meth)acrylates, the hydroxyl groups of the polyester polyols are then partially or fully esterified by reacting with (meth)acrylic acid, (meth)acryloyl chloride, (meth)acrylic anhydride or the like. Polyester (meth)acrylates may also be synthesized by reacting a hydroxyl-containing (meth)acrylate such as a hydroxyalkyl (meth)acrylate (e.g., hydroxyethyl acrylate) with a polycarboxylic acid. The polyhydroxyl functional and polycarboxylic acid functional components can each have linear, branched, cycloaliphatic or aromatic structures and can be used individually or as mixtures.

Examples of suitable epoxy (meth)acrylates include the reaction products of acrylic or methacrylic acid or mixtures thereof with glycidyl ethers or esters.

Exemplary polyether (meth)acrylate oligomers include, but are not limited to, the condensation reaction products of acrylic or methacrylic acid or mixtures thereof with polyetherols which are polyether polyols. Suitable polyetherols can be linear or branched substances containing ether bonds and terminal hydroxyl groups. Polyetherols can be prepared by ring opening polymerization of epoxides and other oxygen-containing heterocyclic compounds (e.g., ethylene oxide, 1,2-propylene oxide, butene oxide, tetrahydrofuran and combinations thereof) with a starter molecule. Suitable starter molecules include water, hydroxyl functional materials, polyester polyols and amines. Polyetherols may also be obtained by the condensation of diols such as glycols.

Urethane (meth)acrylates (sometimes also referred to as "polyurethane (meth)acrylates") capable of being used in the curable compositions of the present invention include urethanes based on aliphatic and/or aromatic polyester polyols, polyether polyols and polycarbonate polyols and aliphatic and/or aromatic polyester diisocyanates and polyether diisocyanates capped with (meth)acrylate end-groups.

In various embodiments, the urethane (meth)acrylates may be prepared by reacting aliphatic and/or aromatic polyisocyanates (e.g., diisocyanates, triisocyanates) with OH group terminated polyester polyols (including aromatic, aliphatic and mixed aliphatic/aromatic polyester polyols), polyether polyols, polycarbonate polyols, polycaprolactone polyols, polydimethysiloxane polyols, or polybutadiene polyols, or combinations thereof to form isocyanate-functionalized oligomers which are then reacted with hydroxyl-functionalized (meth)acrylates such as hydroxyethyl (meth)acrylate or hydroxypropyl (meth)acrylate to provide terminal (meth)acrylate groups. For example, the urethane (meth)acrylates may contain two, three, four or more (meth)acrylate functional groups per molecule. Other orders of addition may also be practiced to prepare the polyurethane (meth)acrylate, as is known in the art. For example, the hydroxyl-functionalized (meth)acrylate may be first reacted with a polyisocyanate to obtain an isocyanate-functionalized (meth)acrylate, which may then be reacted with an OH group terminated polyester polyol, polyether polyol, polycarbonate polyol, polycaprolactone polyol, polydimethysiloxane polyol, polybutadiene polyol, or a combination thereof. In yet another embodiment, a polyisocyanate may be first reacted with a polyol, including any of the aforementioned types of polyols, to obtain an isocyanate-functionalized polyol, which is thereafter reacted with a hydroxyl-functionalized (meth)acrylate to yield a polyurethane (meth)acrylate. Alternatively, all the components may be combined and reacted at the same time.

Any of the above-mentioned types of oligomers may be modified with amines or sulfides (e.g., thiols), following procedures known in the art. Such amine- and sulfide-modified oligomers may be prepared, for example, by reacting a relatively small portion (e.g., 2-15%) of the (meth)acrylate functional groups present in the base oligomer with an amine (e.g., a secondary amine) or a sulfide (e.g., a thiol), wherein the modifying compound adds to the carbon-carbon double bond of the (meth)acrylate in a Michael addition reaction.

Illustrative examples of suitable monomeric (meth)acrylate-functionalized organic substances include (meth)acrylated mono- and polyols (polyalcohols) and (meth)acrylated alkoxylated mono-alcohols and polyols. The mono-alcohols and polyols may be aliphatic (including one or more cycloaliphatic rings) or may contain one or more aromatic rings (as in the case of phenol or bisphenol A). "Alkoxylated" means that the base mono-alcohol or polyol has been reacted with one or more epoxides such as ethylene oxide and/or propylene oxide so as to introduce one or more ether moieties (e.g., —$CH_2CH_2$—O—) onto one or more hydroxyl groups of the mono-alcohol or polyol, prior to esterification to introduce one or more (meth)acrylate functional groups. For example, the amount of epoxide reacted with the mono-alcohol or polyol may be from about 1 to about 30 moles of epoxide per mole of mono-alcohol or polyol. Examples of suitable mono-alcohols include, but are not limited to, straight chain, branched and cyclic C1-C54 mono-alcohols (which may be primary, secondary or tertiary alcohols). For instance, the mono-alcohol may be a C1-C7 aliphatic mono-alcohol. In another embodiment, the mono-alcohol may be a C8-C24 aliphatic mono-alcohol (e.g., lauryl alcohol, stearyl alcohol). Examples of suitable polyols include organic compounds containing two, three, four or more hydroxyl groups per molecule such as glycols (diols), e.g., ethylene glycol, 1,2- or 1,3-propylene glycol, or 1,2-, 1,3- or 1,4-butylene glycol, neopentyl glycol, trimethylolpropane, triethylolpropane, pentaerythritol, glycerol and the like.

Representative, but not limiting, examples of suitable monomeric (meth)acrylate-functionalized compounds include: 1,3-butylene glycol di(meth)acrylate, 1,4-butanediol di(meth)acrylate, 1,6-hexanediol di(meth)acrylate, longer chain aliphatic di(meth)acrylates (such as those generally corresponding to the formula $H_2C=CRC(=O)$—O—$(CH_2)_m$—O—$C(=O)CR'=CH_2$, wherein R and R' are independently H or methyl and m is an integer of 8 to 24), alkoxylated (e.g., ethoxylated, propoxylated) hexanediol di(meth)acrylates, alkoxylated (e.g., ethoxylated, propoxylated) neopentyl glycol di(meth)acrylates, dodecyl di(meth)acrylates, cyclohexane dimethanol di(meth)acrylates, diethylene glycol di(meth)acrylates, dipropylene glycol di(meth)acrylates, alkoxylated (e.g., ethoxylated, propoxylated) bisphenol A di(meth)acrylates, ethylene glycol di(meth)

acrylates, neopentyl glycol di(meth)acrylates, tricyclodecane dimethanol diacrylates, triethylene glycol di(meth)acrylates, tetraethylene glycol di(meth)acrylates, tripropylene glycol di(meth)acrylates, ditrimethylolpropane tetra(meth)acrylates, dipentaerythritol penta(meth)acrylates, alkoxylated (e.g., ethoxylated, propoxylated) pentaerythritol tetra(meth)acrylate, dipentaerythritol penta(meth)acrylates, pentaerythritol tetra(meth)acrylate, alkoxylated (e.g., ethoxylated, propoxylated) trimethylolpropane tri(meth) acrylates, alkoxylated (e.g., ethoxylated, propoxylated) glyceryl tri(meth)acrylates, trimethylolpropane tri(meth)acrylates, pentaerythritol tri(meth)acrylates, tris (2-hydroxy ethyl) isocyanurate tri(meth)acrylates, 2(2-ethoxyethoxy) ethyl (meth)acrylates, 2-phenoxyethyl (meth)acrylates, 3,3,5-trimethylcyclohexyl (meth)acrylates, alkoxylated lauryl (meth)acrylates, alkoxylated phenol (meth)acrylates, alkoxylated tetrahydrofurfuryl (meth)acrylates, caprolactone (meth)acrylates, cyclic trimethylolpropane formal (meth)acrylates, sdicyclopentadienyl (meth)acrylates, diethylene glycol methyl ether (meth)acrylates, alkoxylated (e.g., ethoxylated, propoxylated) nonyl phenol (meth)acrylates, isobornyl (meth)acrylates, isodecyl (meth)acrylates, isooctyl (meth)acrylates, lauryl (meth)acrylates, methoxy polyethylene glycol (meth)acrylates, octyldecyl (meth)acrylates (also known as stearyl (meth)acrylates), tetrahydrofurfuryl (meth)acrylates, tridecyl (meth)acrylates, triethylene glycol ethyl ether (meth)acrylates, t-butyl cyclohexyl (meth)acrylates, dicyclopentadiene di(meth)acrylates, phenoxyethanol (meth)acrylates, octyl (meth)acrylates, decyl (meth)acrylates, dodecyl (meth)acrylates, tetradecyl (meth)acrylates, cetyl (meth)acrylates, hexadecyl (meth)acrylates, behenyl (meth)acrylates, diethylene glycol ethyl ether (meth)acrylates, diethylene glycol butyl ether (meth)acrylates, triethylene glycol methyl ether (meth)acrylates, dodecanediol di (meth)acrylates, dipentaerythritol penta/hexa(meth)acrylates, pentaerythritol tetra(meth)acrylates, alkoxylated (e.g., ethoxylated, propoxylated) pentaerythritol tetra(meth)acrylates, di-trimethylolpropane tetra(meth)acrylates, alkoxylated (e.g., ethoxylated, propoxylated) glyceryl tri(meth) acrylates, and tris (2-hydroxy ethyl) isocyanurate tri(meth) acrylates, and combinations thereof.

Other types of polymerizing organic substances containing ethylenically unsaturated functional groups suitable for use in component (c) of the curable compositions of the present invention include vinyl esters, 1,1-diester-1-alkenes, 1,1-diketo-1-alkenes, 1-ester-1-keto-1-alkenes and icatonates, including methylene malonates and/or methylene beta-diketones.

According to particularly preferred embodiments of the invention, the polymerizing organic substance(s) which make up component (c) of the curable composition is or are selected to be compatible with the multistage polymer(s) and (meth)acrylic polymer(s) (P1) which respectively make up component (a) and component (b) of the curable composition. As used herein, the term "compatible" means that a curable composition does not gel or increase in viscosity to an unacceptable degree when the components of the curable composition are combined.

For example, according to certain embodiments of the invention, the various components of the curable composition are selected such that the curable composition as initially prepared at 25° C. has an initial viscosity at 25° C. (preferably, an initial viscosity not greater than 10,000 mPa·s (cP), not greater than 8000 mPa·s (cP), not greater than 6000 mPa·s (cP), not greater than 5000 mPa·s (cP), not greater than 4000 mPa·s (cP), not greater than 3000 mPa·s (cP) or not greater than 2000 mPa·s (cP) at 25° C.) and the viscosity does not increase by more than 20%, or more than 15%, or more than 10% or more than 5% after standing at 25° C. for seven days. The viscosity is measured at 25° C. using a Brookfield viscometer, model DV-II, using a 27 spindle (with the spindle speed varying typically between 20 and 200 rpm, depending on viscosity).

According to certain advantageous embodiments of the invention, the polymerizing organic substance or mixture of polymerizing organic substances utilized as component (c) of the curable composition is selected based on its Hansen solubility parameters, which reflect the physicochemical dissolution properties, also called capacities for solvation, of organic substances. Hansen solubility parameters can be calculated according to the approach proposed by Charles Hansen in the work with the title "Hansen Solubility Parameters: A user's handbook", Second Edition (2007) Boca Raton, Fla.: CRC Press. ISBN 978-O-8493-7248-3. According to this approach, three parameters, called "Hansen parameters": $\delta_d$, $\delta_p$, and $\delta_h$, are sufficient for predicting the behavior of a solvent with respect to a given molecule. The parameter $\delta_d$, in $MPa^{1/2}$, quantifies the energy of the forces of dispersion between the molecules, i.e., the van der Waals forces. The parameter $\delta_p$, in $MPa^{1/2}$, represents the energy of the intermolecular dipolar interactions. Finally, the parameter $\delta_h$, in $MPa^{1/2}$, quantifies the energy derived from the intermolecular hydrogen bonds, i.e., the capacity to interact via a hydrogen bond. The sum of the squares of the three parameters corresponds to the square of the Hildebrand solubility parameter ($\delta_{tot}$).

Component (c), in certain embodiments of the invention, has a Hansen solubility parameter $\delta_{tot}$ of from 18.7 $MPa^{1/2}$ to 21.7 $MPa^{1/2}$ at 25° C. In further embodiments, component (c) has at least one of a $\beta_p$ value of from 9 $MPa^{1/2}$ to 13 $MPa^{1/2}$, preferably from 9 $MPa^{1/2}$ to 10.5 $MPa^{1/2}$, at 25° C., a $\delta_h$ value of from 4 $MPa^{1/2}$ to 11 $MPa^{1/2}$, preferably from 5 $MPa^{1/2}$ to 10 $MPa^{1/2}$, at 25° C., or a $\delta_d$ value of 12.9 $MPa^{1/2}$ to 16.9 $MPa^{1/2}$ at 25° C.

Suitable polymerizing organic substances include epoxy-functionalized organic substances capable of being cationically polymerized, such as glycidyl ethers. Mono-, di-, tri- and polyglycidyl ether compounds, and alicyclic ether compounds including those comprising residue of carboxylic acids such as, for example, alkylcarboxylic acid residual groups, alkylcycloalkylcarboxylic acid residual groups and dialkyl dicarboxylic acid residual groups may be used, for example. Suitable epoxy-functionalized organic substances that can be used as component (c) include, for example, bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy)cyclohexane-1,4-dioxane, bis(3,4-epoxycyclohexylmethyl)adipate, vinylcyclohexene oxide, 4-vinylepoxycyclohexane, bis(3,4-epoxy-6-methylcyclohexylmethyl)adipate, 3,4-epoxy-6-methylcyclohexy 1-3',4'-epoxy-6'-methylcyclohexanecarboxylate, methylenebis(3,4-epoxycyclohexane), dicyclopentadiene diepoxide, di(3,4-epoxycyclohexylmethyl) ether of ethylene glycol, ethylenebis(3,4-epoxycyclohexanecarboxylate), epoxyhexahydrodioctylphthalate, epoxyhexahydro-di-2-ethylhexyl phthalate, 1,4-butanediol diglycidyl ether, 1,6-hexanediol diglycidyl ether, glycerol triglycidyl ether, trimethylolpropane triglycidyl ether, polyethylene glycol diglycidyl ether, polypropylene glycol diglycidyl ether, polyglycidyl ethers of polyether polyol obtained by the addition of one or more alkylene oxides to aliphatic polyhydric alcohols such as ethylene glycol, propylene glycol, and glycerol, diglycidyl esters of aliphatic long-chain dibasic acids, monoglycidyl ethers of aliphatic higher alcohols, monoglycidyl ethers of phenol, cresol, butyl phenol, or polyether alcohols obtained by the addition of alkylene oxide to these compounds, glycidyl esters of higher fatty acids, epoxidized soybean oil, epoxybutylstearic acid, epoxyoctylstearic acid, epoxidized linseed oil, epoxidized polybutadiene, and the like.

Examples of other cationically polymerizable organic substances which can be used in component (c) include oxetanes such as trimethylene oxide, 3,3-dimethyloxetane, 3,3-dichloromethyloxetane, 3-ethyl-3-phenoxymethyloxetane, and bis(3-ethyl-3-methyloxy)butane; oxolanes such as tetrahydrofuran and 2,3-dimethyltetrahydrofuran; cyclic acetals such as trioxane, 1,3-dioxolane, and 1,3,6-trioxanecyclooctane; cyclic lactones such as β-propiolactone and ε-caprolactone; thiiranes such as ethylene sulfide, 1,2-propylene sulfide, and thioepichlorohydrin; thiethanes such as 3,3-dimethylthiethane; vinyl ethers such as ethylene glycol divinyl ether, triethylene glycol divinyl ether, trimethylolpropane trivinyl ether; spino orthoesters obtained by the reaction of an epoxy compound and lactone; ethylenically unsaturated compounds such as aliphatic vinyl monomers (e.g., vinylcyclohexane), olefins such isobutylene, dienes such as butadiene, vinyl alkyl ethers, vinyl aromatic monomers such as styrene and alkylstyrenes, (meth)acrylic nitrile and unsaturated polymers such as polybutadiene; derivatives of the above organic substances; and the like, at least some of which may also be polymerizable by free radical mechanisms.

According to various embodiments of the invention, component (c) comprises, consists essentially of or consists of one or more polymerizing organic substances selected from the group consisting of tetrahydrofurfuryl methacrylate, cyclic trimethylolpropane formal acrylate, methoxy polyethylene glycol monomethacrylates containing on average from about 6 to about 15 ethylene oxide units, polyethylene glycol dimethacrylates containing from about 3 to about 7 ethylene oxide units, 1,4-butanediol dimethacrylate, trimethylolpropane trimethacrylate, ethoxylated pentaerythiritol tetraacrylates containing from about 2 to about 6 ethylene oxide units, hydroxypropyl methacrylate, ethoxylated bisphenol A dimethacrylates containing from about 1 to about 12 ethylene oxide units, tricyclodecanemethanol acrylate, dicyclodecanedimethananol diacrylate, (meth) acrylate-functionalized urethane oligomers and combinations thereof.

Photoinitiators

In certain embodiments of the invention, the curable compositions described herein include at least one photoinitiator and are curable with radiant energy. A photoinitiator may be considered any type of substance that, upon exposure to radiation (e.g., actinic radiation), forms species that initiate the reaction and curing of polymerizing organic substances present in the curable composition, such as monomeric polymerizing organic substances as well as oligomeric polymerizing organic substances. Suitable photoinitiators include both free radical photoinitiators as well as cationic photoinitiators and combinations thereof.

Free radical polymerization initiators are substances that form free radicals when irradiated.

When the curable composition contains polymerizing organic substances containing polymerizable (reactive) ethylenically unsaturated functional groups such as (meth) acrylate functional groups, the use of free radical photoinitiators is especially preferred. Non-limiting types of free radical photoinitiators suitable for use in the curable compositions of the present invention include, for example, benzoins, benzoin ethers, acetophenones, benzyl, benzyl ketals, anthraquinones, phosphine oxides, α-hydroxyketones, phenylglyoxylates, α-aminoketones, benzophenones, thioxanthones, xanthones, acridine derivatives, phenazene derivatives, quinoxaline derivatives and triazine compounds. Examples of particular suitable free radical photoinitiators include, but are not limited to, 2-methylanthraquinone, 2-ethylanthraquinone, 2-chloroanthraquinone, 2-benzyanthraquinone, 2-t-butylanthraquinone, 1,2-benzo-9,10-anthraquinone, benzyl, benzoins, benzoin ethers, benzoin, benzoin methyl ether, benzoin ethyl ether, benzoin isopropyl ether, alpha-methylbenzoin, alpha-phenylbenzoin, Michler's ketone, acetophenones such as 2,2-dialkoxybenzophenones and 1-hydroxyphenyl ketones, benzophenone, 4,4'-bis-(diethylamino) benzophenone, acetophenone, 2,2-diethyloxyacetophenone, diethyloxyacetophenone, 2-isopropylthioxanthone, thioxanthone, diethyl thioxanthone, 1,5-acetonaphthylene, ethyl-p-dimethylaminobenzoate, benzil ketone, α-hydroxy keto, 2,4,6-trimethylbenzoyldiphenyl phosphine oxide, benzyl dimethyl ketal, 2,2-dimethoxy-1,2-diphenylethanone, 1-hydroxycylclohexyl phenyl ketone, 2-methyl-1-[4-(methylthio) phenyl]-2-morpholinopropanone-1,2-hydroxy-2-methyl-1-phenyl-propanone, oligomeric α-hydroxy ketone, benzoyl phosphine oxides, phenylbis(2,4,6-trimethylbenzoyl)phosphine oxide, ethyl-4-dimethylamino benzoate, ethyl(2,4,6-trimethylbenzoyl) phenyl phosphinate, anisoin, anthraquinone, anthraquinone-2-sulfonic acid, sodium salt monohydrate, (benzene) tricarbonylchromium, benzil, benzoin isobutyl ether, benzophenone/1-hydroxycyclohexyl phenyl ketone, 50/50 blend, 3,3',4,4'-benzophenonetetracarboxylic dianhydride, 4-benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, dibenzosuberenone, 4,4'-dihydroxybenzophenone, 2,2-dimethoxy-2-phenylacetophenone, 4-(dimethylamino)benzophenone, 4,4'-dimethylbenzil, 2,5-dimethylbenzophenone, 3,4-dimethylbenzophenone, diphenyl(2,4,6-trimethylbenzoyl)phosphine oxide/2-hydroxy-2-methylpropiophenone, 50/50 blend, 4'-ethoxyacetophenone, 2,4,6-trimethylbenzoyldiphenylphophine oxide, phenyl bis(2,4,6-trimethyl benzoyl) phosphine oxide, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, (cumene) cyclopentadienyl iron(ii) hexafluorophosphate, 9,10-diethoxy and 9,10-dibutoxyanthracene, 2-ethyl-9,10-dimethoxyanthracene, thioxanthen-9-one and combinations thereof.

Suitable cationic photoinitiators include any type of photoinitiator that, upon exposure to radiation such as actinic radiation, forms cations (e.g., Brönsted or Lewis acids) that initiate the reaction of the monomeric and (if present) oligomeric polymerizing organic substances in the curable composition. For example, a cationic photoinitiator may be comprised of a cationic portion and an anionic portion. The cationic portion of the photoinitiator molecule can be responsible for the absorption of UV radiation while the anionic portion of the molecule becomes a strong acid after UV absorption. Suitable cationic photoinitiators include, for example, onium salts with anions of weak nucleophilicity, such as halonium salts, iodonium salts (e.g., diaryliodonium salts such as bis(4-t-butylphenyl) iodonium perfluoro-1-butane sulfonate) or sulfonium salts (e.g., triarylsulfonium salts such as triarylsulfonium hexafluoroantimonate salts); sulfoxonium salts; and diazonium salts. Metallocene salts are another type of suitable cationic photoinitiator.

The amount of photoinitiator may be varied as may be appropriate depending upon the photoinitiator(s) selected, the amounts and types of polymerizing organic substances (monomeric and oligomeric) present in the curable composition, the radiation source and the radiation conditions used, among other factors. Typically, however, the amount of photoinitiator may be from 0.05% to 5%, preferably 0.1% to 2% by weight, based on the total weight of the curable composition.

In certain embodiments of the invention, the curable compositions described herein do not include any initiator and are curable (at least in part) with electron beam (EB) energy. In other embodiments, the curable compositions described herein include at least one free radical initiator that decomposes when heated or in the presence of an accelerator and are curable chemically (i.e., without having to expose the curable composition to radiation). The at least one free radical initiator that decomposes when heated or in the presence of an accelerator may, for example, comprise a peroxide or azo compound. Suitable peroxides for this purpose may include any compound, in particular any organic compound, that contains at least one peroxy (—O—O—) moiety, such as, for example, dialkyl, diaryl and aryl/alkyl peroxides, hydroperoxides, percarbonates, peresters, peracids, acyl peroxides and the like. The at least one accelerator may comprise, for example, at least one tertiary amine and/or one or more other reducing agents based on M-containing salts (such as, for example, carboxylate salts of transition M-containings such as iron, cobalt, manganese, vanadium and the like and combinations thereof). The accelerator(s) may be selected so as to promote the decomposition of the free radical initiator at room or ambient temperature to generate active free radical species, such that curing of the curable composition is achieved without having to heat or bake the curable composition. In other embodiments, no accelerator is present and the curable composition is heated to a temperature effective to cause decomposition of the free radical initiator and to generate free radical species which initiate curing of the polymerizable compound(s) present in the curable composition.

Thus, in various embodiments of the present invention, the curable compositions described herein are curable by techniques selected from the group consisting of radiation curing (e.g., UV radiation or electron beam curing, including LED curing), chemical curing (using a free radical initiator that decomposes when heated or in the presence of an accelerator, e.g., peroxide curing), heat curing or combinations thereof. For example, a curable composition may be cured by first exposing the curable composition to radiation (e.g., ultraviolet radiation) to obtain a partially cured article, when is then heated at an elevated temperature to effect more complete curing (i.e., further reaction of polymerizing species present in the partially cured article).

Other Additives/Components

The curable compositions of the present invention may optionally contain one or more additives instead of or in addition to the above-mentioned ingredients. Such additives include, but are not limited to, antioxidants/photostabilizers, light blockers/absorbers, polymerization inhibitors, foam inhibitors, flow or leveling agents, colorants, pigments, dispersants (wetting agents, surfactants), slip additives, fillers, chain transfer agents, thixotropic agents, matting agents, impact modifiers (other than the multistage polymers and oligomeric polymerizing organic substances already mentioned), waxes or other various additives, including any of the additives conventionally utilized in the coating, sealant, adhesive, molding, 3D printing or ink arts.

To protect against premature gelling or curing of the curable composition, particularly in the presence of oxygen or other oxidant, one or more antioxidants may be included in the curable composition. Any of the antioxidants known in the art may be utilized, including for example phenol-based antioxidants, phosphorus-based antioxidants, quinone-type antioxidants and combinations thereof.

Examples of suitable phenol-based antioxidants may include hindered phenol-type antioxidants such as hexamethylene bis[(3,5-di-tert-butyl-4-hydroxyphenyl)propionic acid amide], 4,4'-thio bis(6-tert-butyl-m-cresol), 2,2'-methylene bis(4-methyl-5-tert-butylphenol), 2,2'-methylene bis(4-ethyl-6-tert-butylphenol), bis[3,3-bis(4-hydroxy-3-tert-butylphenyl)butyric acid]glycol ester, 2,2'-ethylidene bis(4,6-di-tert-butylphenol), 2,2'-ethylidene bis(4-sec-butyl-6-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3,5-di-tert-butyl-4-hydroxyphenyl) propionate]methane, 2-tert-butyl-4-methyl-6-(2-acryloyloxy-3-tert-butyl-5-methylbenzyl)phenol, 3,9-bis[1,1-dimethyl-2-{(3-tert-butyl-4-hydroxy-5-methylphenyl)propionyloxy}ethyl]-2,4,8,10-tetraoxaspiro[5.5]undecane, triethylene glycol bis[(3-tert-butyl-4-hydroxy-5-methylphenyl)propionate], and n-octadecyl-3-(4'-hydroxy-3',5'-di-tert-butylphenyl)butane. Butylated hydroxy toluene (BHT) is an example of a preferred antioxidant.

Examples of suitable phosphorus-based antioxidants may include phosphites, phosphonites and the like such as tris-nonylphenyl phosphite, tris(2,4-di-tert-butylphenyl)phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, distearyl pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, tetra(tridecyl)isopropylidene diphenol diphosphite, tetra(tridecyl)-4,4'-n-butylidene bis(2-tert-butyl-5-methylphenol)diphosphite, hexa(tridecyl)-1,1,3-tris (2-methyl-4-hydroxy-5-tert-butylphenyl)butane triphosphite, tetrakis(2,4-di-tert-butylphenyl) biphenylene diphosphonite, 9,10-dihydro-9-oxa-10-phosphaphenanthrene-10-oxide, 2,2'-methylene bis(4-methyl-6-tert-butylphenyl)-2-ethylhexyl phosphite, and 4-[3-[(2,4,8,10-tetra-tert-butyldibenzo[d,f][1,3,2]dioxaphosphepin)-6-yloxy]propyl]-2-methyl-6-tert-butylphenol.

Quinone-type antioxidants, such as the mono methyl ether of hydroquinone (MEHQ), may also be used. Phenothiazine (RTZ) and vitamin E are examples of other suitable antioxidants useful in the present invention.

Typically, one or more antioxidants may be included in the curable composition in a total amount of up to 4% by weight, e.g., 0.05 to 2% by weight, based on the weight of the curable composition.

The curable compositions of the present invention may comprise one or more light blockers (sometimes referred to in the art as absorbers), particularly where the curable composition is to be used as a resin in a three-dimensional printing method involving photocuring of the curable composition. The light blocker(s) may be any such substances known in the three-dimensional printing art, including for example non-reactive pigments and dyes. The light blocker may be a visible light blocker or a UV light blocker, for example. Examples of suitable light blockers include, but are not limited to, titanium dioxide, carbon black and organic ultraviolet light absorbers such as hydroxybenzophenone, hydroxyphenylbenzotriazole, oxanilide, benzophenone, thioxanthone, hydroxyphenyltriazine, Sudan I, bromothymol blue, 2,2'-(2,5-thiophenediyl)bis(5-tert-butylbenzoxazole) (sold under the brand name "Benetex OB Plus") and benzotriazole ultraviolet light absorbers.

The amount of light blocker may be varied as may be desired or appropriate for particular applications. Generally speaking, if the curable composition contains light blocker, it is present in a concentration of from 0.001 to 10% by weight based on the weight of the curable composition.

Advantageously, the curable compositions of the present invention may be formulated to be solvent-free, i.e., free of any non-reactive volatile substances (substances having a boiling point at atmospheric pressure of 150° C. or less). For example, the curable compositions of the present invention may contain little or no non-reactive solvent, e.g., less than 10% or less than 5% or less than 1% or even 0% non-reactive solvent, based on the total weight of the curable composition. Such solvent-less or low-solvent compositions may be formulated using various components, including for example low viscosity reactive diluents (such as monomeric polymerizing organic substances), which are selected so as to render the curable composition sufficiently low in viscosity, even without solvent being present, that the curable composition can be easily applied at a suitable application temperature to a substrate surface so as to form a relatively thin, uniform layer.

In preferred embodiments of the invention, the curable composition is a liquid at 25° C. In various embodiments of the invention, the curable compositions described herein are formulated to have a viscosity of less than 10,000 mPa·s (cP), or less than 5000 mPa·s (cP), or less than 4000 mPa·s (cP), or less than 3000 mPa·s (cP), or less than 2500 mPa·s (cP), or less than 2000 mPa·s (cP), or less than 1500 mPa·s (cP), or less than 1000 mPa·s (cP) or even less than 500 mPa·s (cP) as measured at 25° C. using a Brookfield viscometer, model DV-II, using a 27 spindle (with the spindle speed varying typically between 20 and 200 rpm, depending on viscosity). In advantageous embodiments of the invention, the viscosity of the curable composition is from 200 to 5000 mPa·s (cP), or from 200 to 2000 mPa·s (cP), or from 200 to 1500 mPa·s (cP), or from 200 to 1000 mPa·s (cP) at 25° C. Relatively high viscosities can provide satisfactory performance in applications where the curable composition is heated above 25° C., such as in three-dimensional printing operations or the like which employ machines having heated resin vats.

Formulation of the Curable Composition

The relative weight proportions of components (a), (b), (c) and (if present) (d) are not believed to be particularly critical and may be varied as desired based on the particular components selected and the characteristics sought in the curable composition and cured articles obtained therefrom. For example, the curable composition in certain embodiments may comprise 0.5 to 25 wt % component (a), 5 to 80 wt % component (b), 10 to 95 wt % component (c), and 0.1 to 10 wt % component (d), wherein the weight of (a), (b), (c) and (d) equals 100% in total (meaning that the aforementioned wt % ranges for each of (a), (b), (c) and (d) is based on the combined weights of those components, not the total weight of the curable composition which may contain components in addition to (a), (b), (c) and (d)).

The amount of (meth)acrylic polymer (P1) in the curable composition may be an amount effective to achieve dispersion of the particles of multistage polymer in component (c). Generally speaking, in preferred embodiments of the invention the concentration of (meth)acrylic polymer (P1) is sufficient to improve dispersion of the multistage polymer particles in the curable composition as compared to the degree of dispersion attained in the absence of (meth)acrylic polymer (P1). In various embodiments of the invention, the relative weight amounts of multistage polymer and (meth)acrylic polymer (P1) may be controlled such that (meth)acrylic polymer is present in an amount of at least 5 wt %, at least 7 wt % or at least 10 wt % of the total weight of multistage polymer and (meth)acrylic polymer (P1). In other embodiments, (meth)acrylic polymer (P1) is present in the curable composition in an amount not greater than 30 wt % of the total weight of multistage polymer and (meth)acrylic polymer (P1). For example, the curable composition may contain 5 wt % to 30 wt % or 5 wt % to 20 wt % (meth)acrylic polymer (P1) based on the total combined weight of multistage polymer and (meth)acrylic polymer P1.

In a preferred embodiment, the one or more (meth)acrylic polymers (P1) employed in the curable composition are soluble at 25° C. in component (c). That is, component (c) functions as a solvent for the (meth)acrylic polymer(s). "Soluble" means that within a certain time the (meth)acrylic polymer(s) (P1) when contacted with component (c) dissolve and a solution of the (meth)acrylic polymer(s) (P1) in component (c) is obtained. The solubility of the (meth)acrylic polymer(s) (P1) in component (c) can be simply tested by mixing the two materials at 25° C. under agitation and visually inspecting the mixture.

According to preferred embodiments, the components of the curable composition are selected so that the curable composition is liquid at least in the temperature range between 0° C. and 60° C. As used in this context, the term "liquid" does not preclude the possibility that some portion of the curable composition (in particular, the multistage polymer) may be present in the form of small, well-dispersed particles in an otherwise liquid matrix.

Generally speaking, curable compositions in accordance with the invention may be prepared by combining the individual components. As previously mentioned, the multistage polymer and (meth)acrylic polymer (P1) may be supplied separately to the curable composition or together as parts of a polymer composition obtained, for example, through a multistage polymerization process in which the (meth)acrylic polymer (P1) is prepared as one of the stages. The curable composition may also be produced using a master batch approach, wherein a master batch comprised of multistage polymer, (meth)acrylic polymer (P1) and a relatively small amount of polymerizing organic substance is first prepared which is later combined with additional polymerizing organic substance and possibly other components (such as photoinitiator) to yield the final curable composition to be employed in the manufacture of a cured article.

Uses for the Curable Composition

The curable compositions described herein may be compositions that are to be subjected to curing by means of free radical polymerization, cationic polymerization or other types of polymerization. In particular embodiments, the curable compositions are photocured (i.e., cured by exposure to actinic radiation such as light, in particular visible or UV light). End use applications for the curable compositions include, but are not limited to, inks, coatings, adhesives, 3D printing resins, molding resins, sealants, composites, antistatic layers, electronic applications, recyclable materials, smart materials capable of detecting and responding to stimuli, and biomedical materials.

Cured compositions prepared from curable compositions as described herein may be used, for example, in three-dimensional articles (wherein the three-dimensional article may consist essentially of or consist of the cured composition), coated articles (wherein a substrate is coated with one or more layers of the cured composition, including encapsulated articles in which a substrate is completely encased by the cured composition), laminated or adhered articles (wherein a first component of the article is laminated or adhered to a second component by means of the cured composition), composite articles or printed articles (wherein graphics or the like are imprinted on a substrate, such as a paper, plastic or M-containing substrate, using the cured composition).

Curing of the curable compositions in accordance with the present invention may be carried out by any suitable method, such as free radical and/or cationic polymerization. One or more initiators, such as a free radical initiator (e.g., photoinitiator, peroxide initiator) may be present in the curable composition. Prior to curing, the curable composition may be applied to a substrate surface in any known conventional manner, for example, by spraying, knife coating, roller coating, casting, drum coating, dipping, and the like and combinations thereof. Indirect application using a transfer process may also be used. A substrate may be any commercially relevant substrate, such as a high surface energy substrate or a low surface energy substrate, such as a metal substrate or plastic substrate, respectively. The substrates may comprise metal, paper, cardboard, glass, thermoplastics such as polyolefins, polycarbonate, acrylonitrile butadiene styrene (ABS), and blends thereof, composites, wood, leather and combinations thereof. When used as an adhesive, the curable composition may be placed between two substrates and then cured, the cured composition thereby bonding the substrates together to provide an adhered article. Curable compositions in accordance with the present invention may also be formed or cured in a bulk manner (e.g., the curable composition may be cast into a suitable mold and then cured).

Curing may be accelerated or facilitated by supplying energy to the curable composition, such as by heating the curable composition and/or by exposing the curable composition to a radiation source, such as visible or UV light, infrared radiation, and/or electron beam radiation. Thus, the cured composition may be deemed the reaction product of the curable composition, formed by curing. A curable composition may be partially cured by exposure to actinic radiation, with further curing being achieved by heating the partially cured article. For example, an article formed from the curable composition (e.g., a 3D printed article) may be heated at a temperature of from 40° C. to 120° C. for a period of time of from 5 minutes to 12 hours.

A plurality of layers of a curable composition in accordance with the present invention may be applied to a substrate surface; the plurality of layers may be simultaneously cured (by exposure to a single dose of radiation, for example) or each layer may be successively cured before application of an additional layer of the curable composition.

The curable compositions which are described herein are especially well-suited for use as resins in three-dimensional printing applications. Three-dimensional (3D) printing (also referred to as additive manufacturing) is a process in which a 3D digital model is manufactured by the accretion of construction material. The 3D printed object is created by utilizing the computer-aided design (CAD) data of an object through sequential construction of two dimensional (2D) layers or slices that correspond to cross-sections of 3D objects. Stereolithography (SL) is one type of additive manufacturing where a liquid resin is hardened by selective exposure to a radiation to form each 2D layer. The radiation can be in the form of electromagnetic waves or an electron beam. The most commonly applied energy source is ultraviolet, visible or infrared radiation.

The inventive curable compositions described herein may be used as 3D printing resin formulations, that is, compositions intended for use in manufacturing three-dimensional articles using 3D printing techniques. Such three-dimensional articles may be free-standing/self-supporting and may consist essentially of or consist of a composition in accordance with the present invention that has been cured. The three-dimensional article may also be a composite, comprising at least one component consisting essentially of or consisting of a cured composition as previously mentioned as well as at least one additional component comprised of one or more materials other than such a cured composition (for example, a metal component or a thermoplastic component). The curable compositions of the present invention are particularly useful in digital light printing (DLP), although other types of three-dimensional (3D) printing methods may also be practiced using the inventive curable compositions (e.g., SLA, inkjet). The curable compositions of the present invention may be used in a three-dimensional printing operation together with another material which functions as a scaffold or support for the article formed from the curable composition of the present invention.

A method of making a three-dimensional article using a curable composition in accordance with the present invention may comprise the steps of:

a) providing (e.g., coating) a first layer of a curable composition in accordance with the present invention onto a surface;

b) curing the first layer, at least partially, to provide a cured first layer;

c) providing (e.g., coating) a second layer of the curable composition onto the cured first layer;

d) curing the second layer, at least partially, to provide a cured second layer adhered to the cured first layer; and e) repeating steps c) and d) a desired number of times to build up the three-dimensional article.

Although the curing steps may be carried out by any suitable means, which will in some cases be dependent upon the components present in the curable composition, in certain embodiments of the invention the curing is accomplished by exposing the layer to be cured to an effective amount of radiation, in particular actinic radiation (e.g., electron beam radiation, UV radiation, visible light, etc.).

The three-dimensional article which is formed may be heated in order to effect thermal curing.

Accordingly, in various embodiments, the present invention provides a process comprising the steps of:
a) providing (e.g., coating) a first layer of a curable composition in accordance with the present invention and in liquid form onto a surface;
b) exposing the first layer imagewise to actinic radiation to form a first exposed imaged cross-section, wherein the radiation is of sufficient intensity and duration to cause at least partial curing (e.g., at least 50% curing, as measured by the % conversion of the polymerizable functional groups initially present in the curable composition) of the layer in the exposed areas;
c) providing (e.g., coating) an additional layer of the curable composition onto the previously exposed imaged cross-section;
d) exposing the additional layer imagewise to actinic radiation to form an additional imaged cross-section, wherein the radiation is of sufficient intensity and duration to cause at least partial curing (e.g., at least 50% curing, as measured by the % conversion of the polymerizable functional groups initially present in the curable composition) of the additional layer in the exposed areas and to cause adhesion of the additional layer to the previously exposed imaged cross-section;
e) repeating steps c) and d) a desired number of times to build up the three-dimensional article.

Thus, the curable compositions of the present invention are useful in the practice of various types of three-dimensional fabrication or printing techniques, including methods in which construction of a three-dimensional object is performed in a step-wise or layer-by-layer manner. In such methods, layer formation may be performed by solidification (curing) of the curable composition under the action of exposure to radiation, such as visible, UV or other actinic irradiation. For example, new layers may be formed at the top surface of the growing object or at the bottom surface of the growing object. The curable compositions of the present invention may also be advantageously employed in methods for the production of three-dimensional objects by additive manufacturing wherein the method is carried out continuously. For example, the object may be produced from a liquid interface. Suitable methods of this type are sometimes referred to in the art as "continuous liquid interface (or interphase) product (or printing)" ("CLIP") methods. Such methods are described, for example, in WO 2014/126830; WO 2014/126834; WO 2014/126837; and Tumbleston et al., "Continuous Liquid Interface Production of 3D Objects," Science Vol. 347, Issue 6228, pp. 1349-1352 (Mar. 20, 2015), the entire disclosure of which is incorporated herein by reference in its entirety for all purposes.

When stereolithography is conducted above an oxygen-permeable build window, the production of an article using a curable composition in accordance with the present invention may be enabled in a CLIP procedure by creating an oxygen-containing "dead zone" which is a thin uncured layer of the curable composition between the window and the surface of the cured article as it is being produced. In such a process, a curable composition is used in which curing (polymerization) is inhibited by the presence of molecular oxygen; such inhibition is typically observed, for example, in curable compositions which are capable of being cured by free radical mechanisms. The dead zone thickness which is desired may be maintained by selecting various control parameters such as photon flux and the optical and curing properties of the curable composition.

The CLIP process proceeds by projecting a continuous sequence of actinic radiation (e.g., UV) images (which may be generated by a digital light-processing imaging unit, for example) through an oxygen-permeable, actinic radiation- (e.g., UV-) transparent window below a bath of the curable composition maintained in liquid form. A liquid interface below the advancing (growing) article is maintained by the dead zone created above the window. The curing article is continuously drawn out of the curable composition bath above the dead zone, which may be replenished by feeding into the bath additional quantities of the curable composition to compensate for the amounts of curable composition being cured and incorporated into the growing article.

For example, printing of a three-dimensional article using the curable compositions described herein may be carried out by a process comprising at least the following steps:
a) providing a carrier and an optically transparent member having a build surface, the carrier and build surface defining a build region therebetween;
b) filling the build region with the curable composition;
c) continuously or intermittently irradiating the build region with actinic radiation to form a cured composition from the curable composition; and
d) continuously or intermittently advancing the carrier away from the build surface to form the three-dimensional article from the cured composition.

The present invention also provides a method of forming a three-dimensional article comprising the steps of: (a) providing a carrier and a build plate, the build plate comprising a semipermeable member, the semipermeable member comprising a build surface and a feed surface separate from the build surface, with the build surface and the carrier defining a build region therebetween, and with the feed surface in fluid contact with a polymerization inhibitor; then (concurrently and/or sequentially) (b) filling the build region with a curable composition in accordance with the invention, the curable composition contacting the build segment, (c) irradiating the build region through the build plate to produce a solid polymerized region in the build region, with a liquid film release layer comprised of the curable composition formed between the solid polymerized region and the build surface, the polymerization of the liquid film being inhibited by the polymerization inhibitor; and (d) advancing the carrier with the polymerized region adhered thereto away from the build surface on the stationary build plate to create a subsequent build region between the polymerized region and the top zone. In general, the method includes (e) continuing and/or repeating steps (b) through (d) to produce a subsequent polymerized region adhered to a previous polymerized region until the continued or repeated deposition of polymerized regions adhered to one another forms the three-dimensional article.

Aspects of the Invention

Certain illustrative, non-limiting aspects of the invention may be summarized as follows:

Aspect 1: A curable composition comprising, consisting essentially of or consisting of component (a), component (b), component (c), and optionally component (d), wherein:
a) component (a) is one or more multistage polymers;
b) component (b) is one or more (meth)acrylic polymers (P1), which is or are the same or different in composition from any (meth)acrylic polymer which may be present as part of the multistage polymer(s) of component (a);
c) component (c) is one or more polymerizing organic substances; and
d) optional component (d) is one or more photoinitiators.

Aspect 2: The curable composition of Aspect 1, wherein component (a) includes at least one multistage polymer selected from the group consisting of:
i) multistage polymers comprising, consisting essentially of or consisting of:
A) an (A) stage polymer comprising a polymer (A1) having a glass transition temperature of less than 0° C.; and
B) a (B) stage polymer comprising a polymer (B1) having a glass transition temperature of at least 30° C.; and
ii) multistage polymers comprising, consisting essentially of or consisting of:
A) an (A) stage polymer comprising, consisting essentially of or consisting of a polymer (A1) having a glass transition temperature of less than 10° C.;
B) a (B) stage polymer comprising, consisting essentially of or consisting of a polymer (B1) having a glass transition temperature of at least 60° C.; and
C) a (C) stage polymer comprising, consisting essentially of or consisting of a polymer (C1) having a glass transition temperature of at least 30° C., wherein the (C) stage polymer may provide at least a part of component (b).

Aspect 3: The curable composition according to Aspect 2, wherein the (B) stage polymer is grafted onto the (A) stage polymer.

Aspect 4: The curable composition according to Aspect 2 or 3 wherein polymers (A1) and (B1) are (meth)acrylic polymers, having compositions which are different from that of (meth)acrylic polymer (P1).

Aspect 5: The curable composition according to any of Aspects 1 to 4 wherein the one or more (meth)acrylic polymers are soluble at 25° C. in component (c).

Aspect 6: The curable composition according to any of Aspects 1 to 5 wherein the one or more (meth)acrylic polymers comprise at least 50 wt % methyl methacrylate.

Aspect 7: The curable composition according to any of Aspects 1 to 6 wherein component (b) has a glass transition temperature of at least 30° C.

Aspect 8: The curable composition according to any of Aspects 2 to 7 wherein polymer (A1) is a polyorganosiloxane or comprises at least 50 wt % of polymeric units coming from isoprene or butadiene.

Aspect 9: The curable composition according to any of Aspects 1 to 8 wherein the one or more (meth)acrylic polymers (P1) of component (b) are not grafted on the one or more multistage polymers of component (a).

Aspect 10: The curable composition of any of Aspects 1 to 9, wherein component (c) includes at least one polymerizing organic substance selected from the group consisting of free radical polymerizing organic substances and cationic polymerizing organic substances.

Aspect 11: The curable composition of any of Aspects 1 to 10, wherein component (c) includes at least one polymerizing organic substance selected from the group consisting of ethylenically unsaturated organic substances, heterocycle-containing organic substances, and ethynically unsaturated organic substances.

Aspect 12: The curable composition of any of Aspects 1 to 11, wherein component (c) includes at least one (meth)acrylate-functionalized organic substance.

Aspect 13: The curable composition of any of Aspects 1 to 12, wherein component (c) has a Hansen solubility parameter $\delta_{tot}$ of from 18.7 MPa$^{1/2}$ to 21.7 MPa$^{1/2}$ at 25° C.

Aspect 14: The curable composition of any of Aspects 1 to 13, wherein component (c) has at least one of a $\beta_p$ value of from 9 MPa$^{1/2}$ to 13 MPa$^{1/2}$ at 25° C., a $\delta_h$ value of from 4 MPa$^{1/2}$ to 11 MPa$^{1/2}$ at 25° C., or a $\delta_d$ value of 12.9 MPa$^{1/2}$ to 16.9 MPa$^{1/2}$ at 25° C.

Aspect 15: The curable composition of any of Aspects 1 to 14, wherein component (c) is selected from the group consisting of tetrahydrofurfuryl methacrylate, cyclic trimethylolpropane formal acrylate, methoxy polyethylene glycol monomethacrylates containing on average from about 6 to about 15 ethylene oxide units, polyethylene glycol dimethacrylates containing from about 3 to about 7 ethylene oxide units, 1,4-butanediol dimethacrylate, trimethylolpropane trimethacrylate, ethoxylated pentaerythiritol tetraacrylates containing from about 2 to about 6 ethylene oxide units, hydroxypropyl methacrylate, ethoxylated bisphenol A dimethacrylates containing from about 1 to about 12 ethylene oxide units, tricyclodecanemethanol acrylate, dicyclodecanedimethananol diacrylate, (meth)acrylate-functionalized urethane oligomers and combinations thereof.

Aspect 16: The curable composition of any of Aspects 1 to 15, wherein component (c) includes at least one polymerizing flexibilizer.

Aspect 17: The curable composition of Aspect 16, wherein the at least one polymerizing flexibilizer is selected from the group consisting of (meth)acrylate-functionalized urethane oligomers, (meth)acrylate-functionalized polyester oligomers, (meth)acrylate-functionalized polyether oligomers, epoxy-functionalized oligomers and combinations thereof.

Aspect 18: The curable composition of any of Aspects 1 to 17, wherein component (d) includes at least one photoinitiator selected from the group consisting of free radical photoinitiators, cationic photoinitiators and combinations thereof.

Aspect 19: The curable composition of any of Aspects 1 to 18, additionally comprising, consisting essentially of or consisting of at least one additive selected from the group consisting of stabilizers, light blockers, pigments and dyes.

Aspect 20: The curable composition of any of Aspects 1 to 19, comprising, consisting essentially of or consisting of 0.5 to 25 wt % component (a), 5 to 80 wt % component (b), 10 to 95 wt % component (c), and 0.1 to 10 wt % component (d), wherein the weight of (a), (b), (c) and (d) equals 100% in total.

Aspect 21: The curable composition of any of Aspects 1 to 20, wherein the composition has a content of component (a) of at least 10 wt % and a viscosity at 25° C. of not greater than 10,000 mPa·s (cP).

Aspect 22: A method of making a cured article, comprising curing a curable composition comprising, consisting essentially of or consisting of component (a), component (b), and component (c), wherein:
a) component (a) is one or more multistage polymers;
b) component (b) is one or more (meth)acrylic polymers, which is or are different in composition from any (meth)acrylic polymer which may be present as part of the multistage polymer(s) of component (a); and
c) component (c) is one or more monomeric polymerizing organic substances;
and wherein the curable composition is cured by exposing the curable composition to radiation.

Aspect 23: The method of Aspect 22, wherein the cured article is a three-dimensional article, a coating, a sealant or an adhesive.

Aspect 24: The method of Aspect 22 or 23, wherein the radiation is actinic radiation or electron beam radiation.

Aspect 25: The method of any of Aspects 22 to 24, wherein the curable composition additionally comprises of component (d) and wherein component (d) is one or more photoinitiators.

Aspect 26: The method of any of Aspects 22 to 25, wherein after exposing the curable composition to radiation a step of heating the article prepared from the curable composition is performed.

Aspect 27: A method of making a three-dimensional article, comprising printing the three-dimensional article using a curable composition comprised of component (a), component (b), and component (c), wherein:
  a) component (a) is one or more multistage polymers;
  b) component (b) is one or more (meth)acrylic polymers, which is or are different in composition from any (meth)acrylic polymer which may be present as part of the multistage polymer(s) of component (a); and
  c) component (c) is one or more monomeric polymerizing organic substances.

Aspect 28: The method of Aspect 27, wherein printing of the three-dimensional article is carried out in a layer-by-layer or continuous manner.

Aspect 29: The method of Aspect 27 or 28, wherein printing of the three-dimensional article comprises at least the following steps:
  a) providing a first layer of the curable composition onto a surface;
  b) curing the first layer, at least partially, to provide a cured first layer;
  c) providing a second layer of the curable composition onto the cured first layer;
  d) curing the second layer, at least partially, to provide a cured second layer adhered to the cured first layer; and
  e) repeating steps c) and d) a desired number of times to build up the three-dimensional article.

Aspect 30: The method of any of Aspects 27 to 29, wherein printing of the three-dimensional article comprises at least the following steps:
  a) providing a first layer of the curable composition in liquid form onto a surface;
  b) exposing the first layer imagewise to actinic radiation to form a first exposed imaged cross-section, wherein the radiation is of sufficient intensity and duration to cause at least partial curing of the first layer in the exposed area(s);
  c) providing an additional layer of the curable composition in liquid form onto the previously exposed imaged cross-section;
  d) exposing the additional layer imagewise to actinic radiation to form an additional imaged cross-section, wherein the radiation is of sufficient intensity and duration to cause at least partial curing of the additional layer in the exposed area(s) and to cause adhesion of the additional layer to the previously exposed imaged cross-section;
  e) repeating steps c) and d) a desired number of times to build up the three-dimensional article.

Aspect 31: The method of Aspect 27, wherein printing of the three-dimensional article comprises at least the following steps:
  a) providing a carrier and an optically transparent member having a build surface, the carrier and build surface defining a build region therebetween;
  b) filling the build region with the curable composition;
  c) continuously or intermittently irradiating the build region with actinic radiation to form a cured composition from the curable composition; and
  d) continuously or intermittently advancing the carrier away from the build surface to form the three-dimensional article from the cured composition.

Aspect 32: The method of any of Aspects 27 to 31, wherein after printing the three-dimensional article a step of heating the three-dimensional article is performed or a step of heating in combination with a sequential or a simultaneous irradiating of said article is performed with either actinic radiation or EB radiation or a step of irradiating of said article is performed with either actinic radiation or EB radiation.

Aspect 33: A masterbatch which is useful for preparing a curable composition in accordance with any of Aspects 1 to 21 or 36, wherein the masterbatch comprises the components (a), (b) and (c) but has a higher concentration of component (a)+component (b) (sum of (a)+(b)) than the curable composition to be prepared from said masterbatch by further dilution with at least one component (c).

Aspect 34: A method of making a curable composition in accordance with any of Aspects 1 to 21 or 36, comprising combining a masterbatch with at least a quantity of component (c), wherein the masterbatch has a higher concentration of component (a) and component (b) than the curable composition to be prepared from the masterbatch.

Aspect 35: Use of the curable composition in accordance with any of Aspects 1 to 21 or 36 in a cured article selected from the group consisting of a three-dimensional article, a coating, a sealant or an adhesive.

Aspect 36: The curable composition of any of Aspects 1-21, wherein the one or more (meth)acrylic polymers (P1) of component (b) is or are different in composition from any (meth)acrylic polymer which may be present as part of the multistage polymer(s) of component (a);

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the curable composition, process using the curable composition, or article made using the curable composition. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Test Methods
Glass Transition Temperature

The glass transition temperatures (Tg) of the polymers are measured with equipment able to realize a thermomechanical analysis. A RDAII 10 "RHEOMETRICS DYNAMIC ANALYSER" provided by the Rheometrics Company has been used. The thermomechanical analysis measures precisely the visco-elastic changes of a sample as a function of the temperature, the strain or the deformation applied. The apparatus records continuously the sample deformation, keeping the strain fixed, during a controlled program of temperature variation. The results are obtained by drawing, as a function of the temperature, the elastic modulus (G'), the loss modulus and the tan delta. The Tg is the higher temperature value read in the tan delta curve, when the derivative of tan delta is equal to zero.

Molecular Weight

The weight average molecular weight ($M_w$) of the polymers is measured by size exclusion chromatography (SEC).

Particle Size Analysis

The particle size of the primary particles after a multistage polymerization) is measured with a Zetasizer. The particle size of the polymer powder after recovery is measured with a Malvern Mastersizer 3000 from MALVERN. For the estimation of weight average powder particle size, particle size distribution and ratio of fine particles a Malvern Mastersizer 3000 apparatus with a 300 mm lenses, measuring a range from 0.5-880 μm is used.

Mechanical Properties

Tensile properties including strength, elongation, modulus and energy at break, are measured using an Instron 5966 utilizing standard test method ASTM D638. ASTM D368 is a standard used for the assessment of a materials tensile performance as a molded or machined dogbone and is typically used for materials with high stiffness. The samples tested by this method are molded to Type IV shape according to ASTM D638. The only variable inputs for the test method is sample width and thickness which are measured with calipers and input prior to each specimen test.

Impact Resistance

There are multiple standard tests to measure bulk impact resistance including Charpy and Izod impact testing. Izod impact testing is conducted using a Zwick Roell HIT pendulum impact tester utilizing ASTM D256. Samples tested according to ASTM D256 may be notched or unnotched impact bars; the following results are notched Izod.

Curing Conditions

Photocurable formulations include 0.5-1 weight % on resin photoinitiator (typically TPO-L sold by Lambson or Irgacure 819 sold by BASF). These formulations are cured under 12 W 395 nm LED lamps at approximately ten meters per minute exposing each side of the liquid containing silicone mold one to two times each, depending on the formulation. The photocured parts are often thermally post-cured at 100° C. overnight to decrease any potential plasticizer effect from residual uncured material.

Example of Increased Compatibility and Dispersion Quality

Initial compatibility and dispersion quality can be assessed by visual inspection of a sample mixture of a curable composition. Various types of impact modifying additives not in accordance with the present invention have been found to often cause visible issues ranging from separation, settling, and aggregation to even creaming or gelation, when incorporated into curable compositions based on polymerizing organic substances such as (meth)acrylate-functionalized compounds. These issues are illustrated in FIG. 1. FIG. 1 shows curable compositions which exhibit (from left to right) aggregation, separation and gelation.

Figure 2:
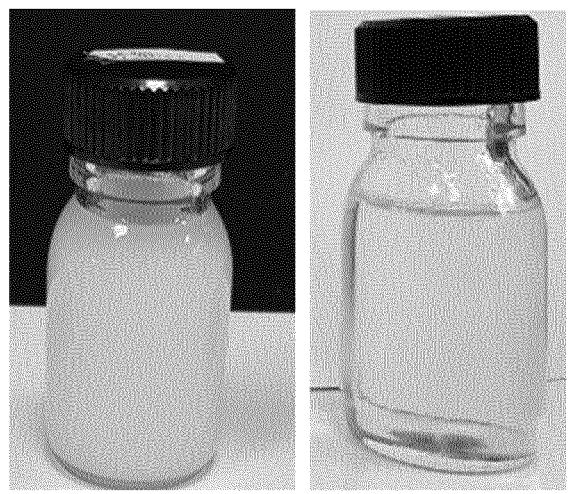

The impact modifying additive evaluated in the present examples (which is a combination of multistage polymer and (meth)acrylic polymer (P1) in accordance with aspects of the invention) was found to be distinct in its ability to be used in curable compositions based on polymerizing organic substances such as (meth)acrylate-functionalized compounds with minimal visual compatibility issues. Dispersions created with up to 25% by weight of the impact modifying additive (multistage polymer+(meth)acrylic polymer (P1)) demonstrate two forms of stable dispersions, one that is opaque and milky in appearance (see FIG. 2, left photograph), and one that is translucent or clear (see FIG. 2, right photograph), provided the polymerizing organic substance(s) in the curable composition are selected to be compatible with the impact modifying additive. While there are certain polymerizing organic substances that can cause compatibility issues with the impact modifying additive employed in the curable compositions of the present invention such as aggregation, sedimentation or gelation, the range of compatible systems has been found to be much less limited than is encountered using other types of impact modifiers.

Figure 3:
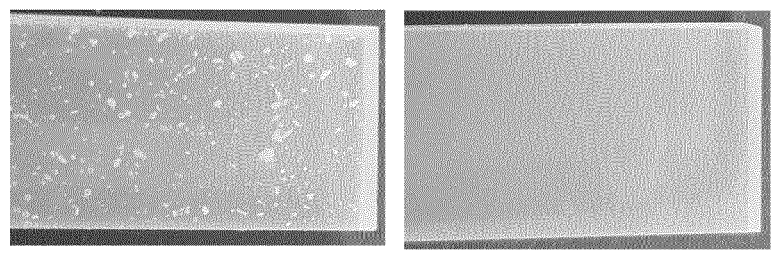
Figure 4:
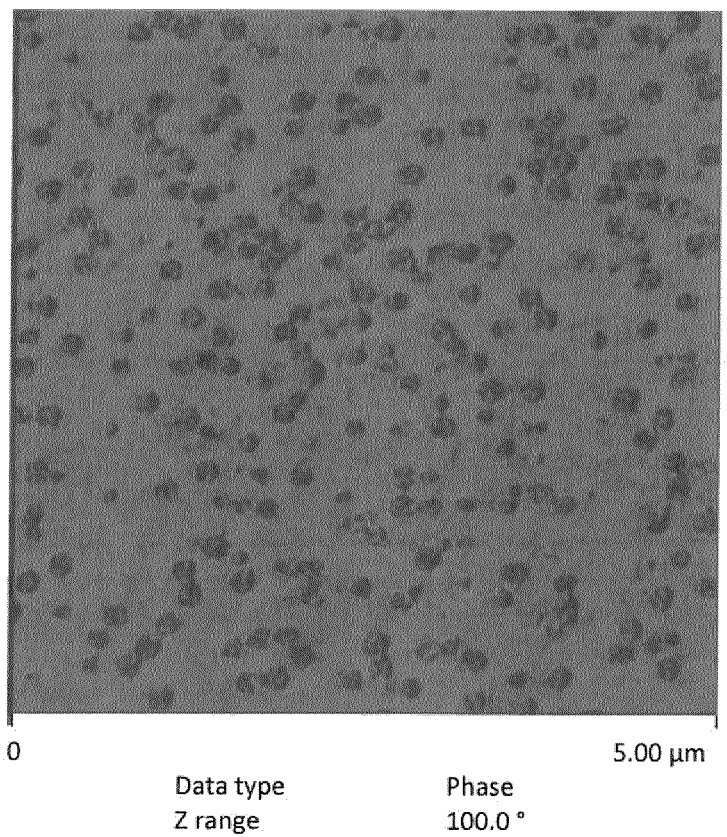

Additionally, it has been observed that increased dispersion quality can be visualized in the final cured system. Poorly dispersed systems often cure to form a heterogeneous appearances while well dispersed systems cure as a homogeneous sample, as illustrated in FIG. 3 (a cured article having poor dispersion quality appears in the left photograph, while a cured article of improved dispersion quality appears in the right photograph). The AFM image provided in FIG. 4, shows an excellent dispersion of the MSP in a monomer.

Example of Low Viscosity Increases

More quantifiably, the compatibility and dispersion quality can be demonstrated by changes in viscosity upon addition of an impact modifying additive (multistage polymer+(meth)acrylic polymer (P1)) in accordance with the present invention. Just as the visual issues would suggest, viscosity spikes are prevalent with conventional impact modifiers. Compatibility issues cause increases in viscosity, especially when gelation occurs, causing formulations to be unusable in many end-use applications. In trials in which conventional impact modifiers were utilized, viscosity spikes caused the addition of such impact modifiers past levels of 5-10 wt % to render systems based on (meth)acrylate-functionalized compounds unworkable at room temperature.

Figure 5:
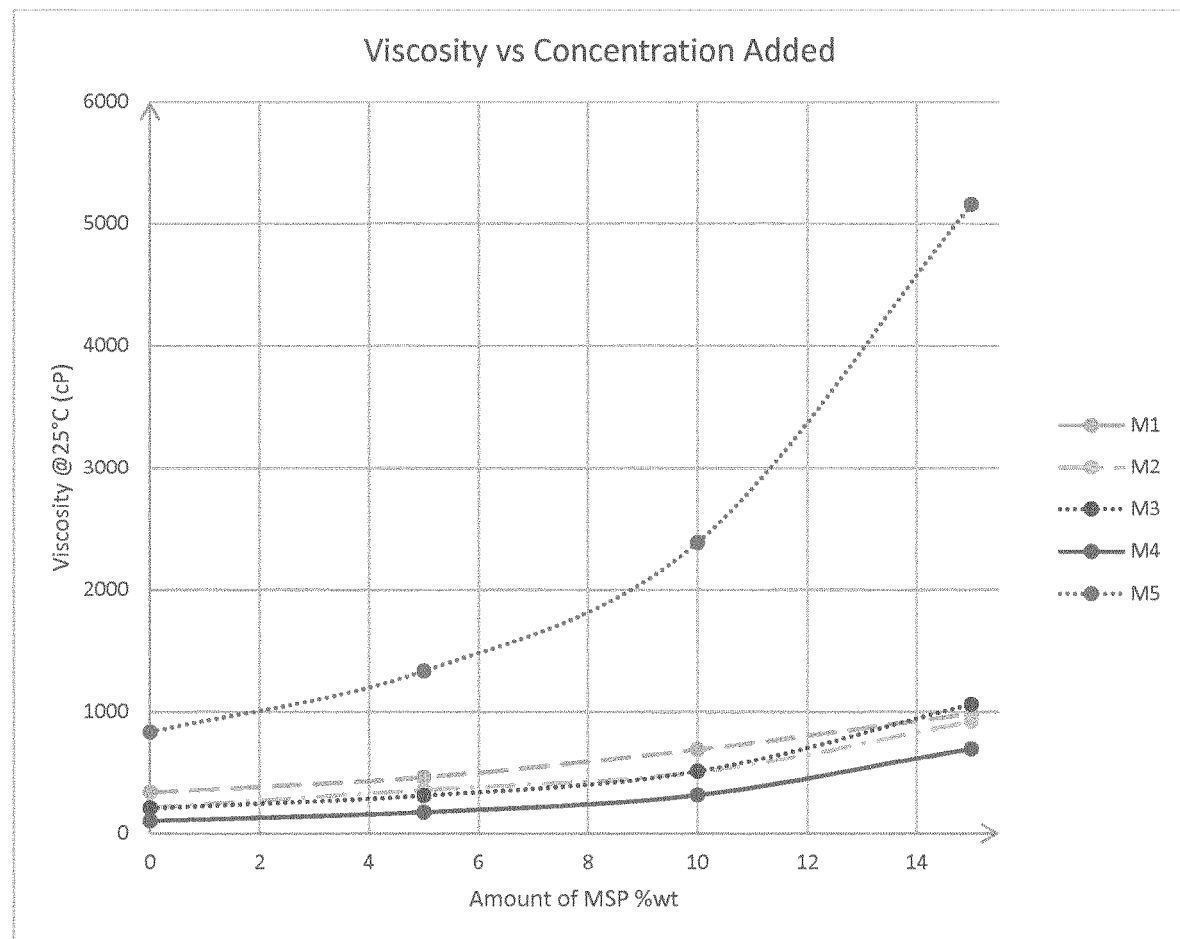

The need for stable viscosities with addition of modifier makes the impact modifying additive of the present invention (a combination of multistage polymer (MSP) and (meth)acrylic polymer (P1)) advantageous. As seen in FIG. 5, the viscosity rises with the addition of the impact modifying additive; however, these increases are low and manageable, yielding final viscosities still well within a desired and workable range. Note that interactions between the (meth)acrylate-functionalized component and the multistage polymer, along with initial viscosity, influence increases in viscosity as seen by (meth)acrylate M5's increase with higher loadings of impact modifying additive (multistage polymer+(meth)acrylic polymer (P1)).

Example of Increased Toughness/Impact

Figure 6:
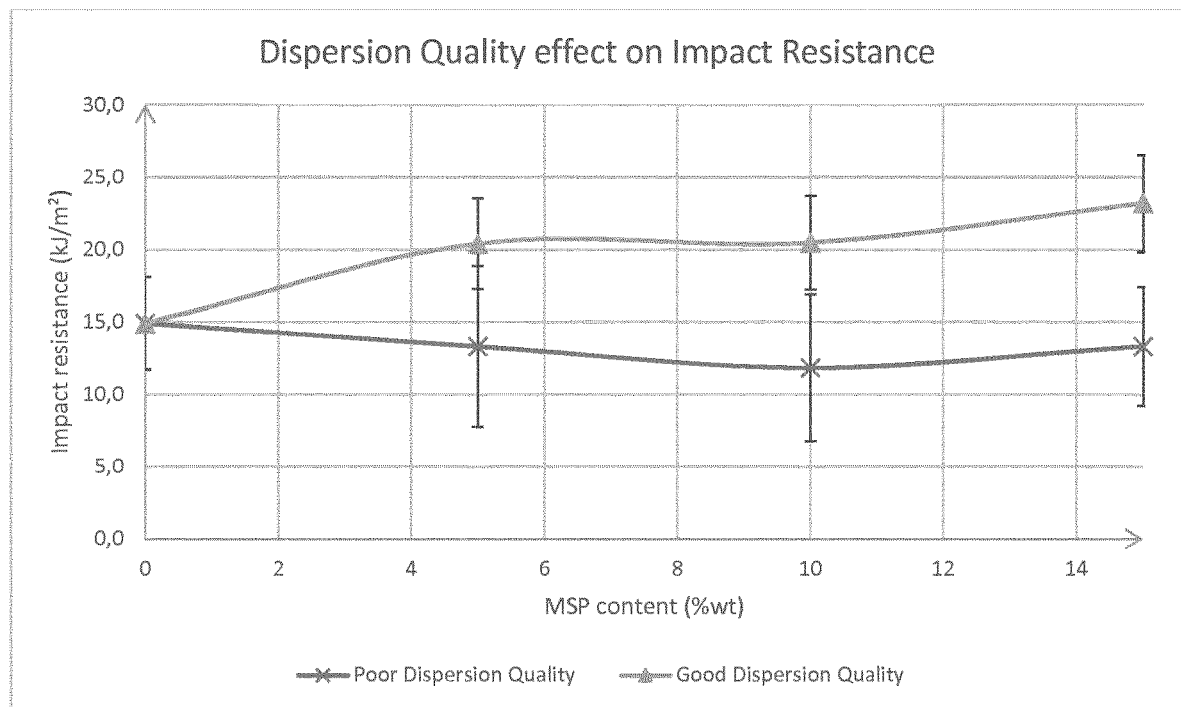

With increased compatibility and dispersion quality, curable composition formulations utilizing both a multistage polymer and (meth)acrylic polymer (P1) in accordance with the present invention can achieve increased toughness while maintaining high mechanical performance. FIG. 6 shows the result of testing which confirms that impact resistance in the cured article prepared from the curable composition is influenced by dispersion quality. Furthermore, the incorporation of 10 wt % multistage polymer+(meth)acrylic polymer (P1) in full formulations, such as F1 Control and F2 Control shown in below (Table 1), demonstrates an advantageous increase in impact resistance and energy at break compared to conventional modifiers (CM) in the same system (Table 2). The first five components listed in Table 1 are commercial products sold by the Sartomer business of Arkema, Inc. Irgacure® 819 is a photoinitiator sold by BASF quantified by weight percent added per hundred of resin (phr).

Tensile properties in Table 2 are averages of three Type IV molded tensile bars according to ASTM D638 tested on an Instron 5966 while impact resistance is an average of four notched Izod impact bars according to ASTM D256 on a Zwick Roell HIT pendulum impact tester. In Table 2, F1 control and F2 control are without any added impact modifier and are exactly as laid out in Table 1. CM refers to core-and-shell comparative materials, which are impact modifiers not of the invention. For example, CM #3 is Geniopearl P52 commercially available from Wacker Chemie and comprises a silicone core with a PMMA shell with an average primary particle size of 200 nm. MSP is the multi-stage polymer of the invention and is prepared in accordance with U.S. Patent Application Publication No. 2017/0369696, incorporated herein by reference for all purposes. In Table 2, CM and MSP were respectively added to F1 Control and F2 Control at 10% by weight.

TABLE 1

| Component | Description | F1 Control Weight % | F2 Control Weight % |
|---|---|---|---|
| CN996 | Difunctional Urethane Acrylate | 40 | — |
| CN9071 | | — | 40 |
| SR531 | Cyclic Trimethylolpropane Formal Acrylate | 30 | 30 |
| SR238B | 1,6-Hexanediol Diacrylate | 20 | 20 |
| SR9035 | Ethoxylated (15) Trimethylolpropane Triacrylate | 10 | 10 |
| Irgacure 819 | Bis(2,4,6-trimethylbenzoyl)-phenyl-phosphineoxide | 0.5 phr | 0.5 phr |

TABLE 2

| | Strength (MPa) | Elongation (%) | Energy at Break (N · m) | Viscosity at 25° C. (mPa · s) | Impact Resistance (J/m) | Impact Std Deviation (J/m) |
|---|---|---|---|---|---|---|
| F1 Control | 10.36 | 31.2 | 0.446 | 793 | 41.85 | 7.75 |
| F1-CM #1 | 12.47 | 39.9 | 0.767 | 1,006 | 49.86 | 2.84 |
| F1-CM #2 | 10.87 | 39.2 | 0.633 | 772 | 40.48 | 15.59 |
| F1-CM #3 | 10.77 | 29.6 | 0.477 | 946 | 44.08 | 5.32 |
| F1-MSP | 12.40 | 35.9 | 1.950 | 823 | 53.26 | 3.15 |
| F2 Control | 7.92 | 31.9 | 0.251 | 3048 | 56.55 | 5.34 |
| F2-CM #1 | 7.52 | 34.5 | 0.380 | 1,372 | 38.42 | 9.15 |
| F2-CM #2 | 8.45 | 47.6 | 0.571 | 7,000 | 57.39 | 16.09 |
| F2-CM #3 | 9.71 | 43.9 | 0.677 | 4,445 | 55.12 | 9.26 |
| F2-MSP | 10.20 | 33.2 | 1.478 | 3075 | 66.34 | 4.90 |

Example of Range of Compatibility

Prior studies have shown impact modifiers to increase toughness in specific systems. The combination of multi-stage polymer and (meth)acrylic polymer (P1) used in the present invention demonstrates a range of acceptable polymerizing organic substances (e.g., (meth)acrylate-functionalized compound) compatibility that can be quantified, and generally governed by, the solubility parameters of the polymerizing organic substances. In this example, Hansen solubility parameters consisting of a hydrogen bonding solubility parameter ($\delta_h$), a polar solubility parameter OA and a dispersion solubility parameter ($\delta_d$), are utilized. They are known to be powerful to evaluate interactions between polymers and their solvents. (see Hansen C; M "*The three-dimensional solubility parameters—key to paint component affinities: I. Solvents, Plasticizers, Polymers and Resins*" in *J. Paint Technol.* 39(511), 104-117, (1967), Hansen, C. M, "*The three-dimensional solubility parameters—key to paint component affinities: II. Dyes, Emulsifiers, Mutual Solubility and Compatibility, and Pigments*" in *J. Paint. Technol.* 39 (511), 505-510, (1967) and Hansen C; M "*The three-dimensional solubility parameters—key to paint component affinities III: Independent Calculation of the parameter Components* in *J. Paint. Technol.* 39 (511), 510-515, (1967)).

The first parameter $\delta_i$ to predict solubility was introduced by Hildebrand and is the square root of $c_i$ the cohesive energy which is defined as the ratio of energy of complete vaporization $\Delta_{vap}h$ and $v_i$ the molar volume of the condensed phase. The closer the Hildebrand parameters $\delta_i$ of solute and solvent are, the better is the solubility.

$$\delta_i = \sqrt{c_i} = \sqrt{\frac{\Delta_{vap}h}{v_i}} \qquad \text{Equation 1}$$

$c_i$ the cohesive energy is in fact the sum of all interatomic/molecular interactions including Van der Waals interactions, covalent bonds, ionic bonds, hydrogen bonds, electrostatic interactions. Therefore, $c_i$ the total cohesive energy that holds a liquid together is assimilated to the sum of the energy required to overcome atomic dispersion forces of London $c_d$, forces between permanent dipoles (polar interaction) $c_p$, and to break hydrogen bonds between molecules (based on the acid and base concept of Lewis) $c_h$.

$$c_i = c_d + c_p c_h \qquad \text{Equation 2}$$

Therefore Hansen expands Hildebrand parameters with 3 solubility parameters as defined in Equation 3, 4, 5, where δd is the dispersive contribution, δp the polar contribution and δh the H-bond contribution. The three contributions $\delta_d$, $\delta_p$ and $\delta_h$ are generally expressed in $J^{1/2}\ m^{-3/2}$ equivalent to $Pa^{1/2}$ in the SI, or in $cal^{1/2}\ cm^{-3/2}$.

$$\delta_p = \sqrt{c_p}\ \delta_p = \sqrt{c_p}\ \delta_d = \sqrt{c_d} \qquad \text{Equations 3-4-5}$$

This allows a better differentiation of the type of preponderate interactions for each monomer in a three-dimensional space called "Hansen space". Therefore a solute can be further defined as a point surrounded by a volume known as "solubility sphere" with the global Hansen solubility parameter described below in Equation 6.

$$\delta_H = \sqrt{(\delta^2_d + \delta^2_p + \delta^2_h)} \qquad \text{Equation 6}$$

The Hansen solubility parameters of monomers have been calculated with semi-empirical data from the group contribution theory of Hoy where all contributions of the functional groups (e. g. $CH_3$, COO) are summed up. Below is an example of calculated Hansen solubility parameters $\delta_H$ and $\delta_P$ for Tertiobutyl Cyclohexyl acrylate. The structure of the molecule is given below with its structural units numbered and the contribution of each functional groups following Hoy theory in Table 3.

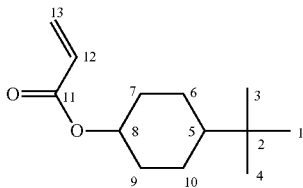

TABLE 3

| Structural unit | Unit identification | Number | $F_{ti}$ | $F_{pi}$ | $V_i$ | $\Delta_{Ti}(P)$ |
|---|---|---|---|---|---|---|
| —CH3— | 1, 3, 4 | 3 | 303.5 | 0 | 21.55 | 0.022 |
| —CH2— | 6, 7, 9, 10 | 4 | 269 | 0 | 15.55 | 0.02 |
| >CH— | 5, 8 | 2 | 176 | 0 | 9.56 | 0.013 |
| >C< | 2 | 1 | 65.5 | 0 | 3.56 | 0.04 |
| 0 | 13 | 1 | 259 | 67 | 19.17 | 0.019 |
| =CH— | 12 | 1 | 249 | 59.5 | 13.18 | 0.0185 |
| —COO— | 11 | 1 | 640 | 528 | 23.7 | 0.05 |
| Aliphatique cycle | / | 1 | −48 | 61 | 0 | −0.0035 |
| Sum | N/A | N/A | 3504 | 715.5 | 205.58 | 0.296 |

Hansen solubility parameters $\delta_H$ and $\delta_P$ are then calculated following the equations below:

$$\delta = \frac{\Sigma Ft_{i+\frac{277}{n}}}{\Sigma V_i} = \frac{3504 + \frac{277}{1,69}}{205,58} = 17,84 \text{ with}$$

$$n = \frac{0,5}{\Sigma \Delta T_i} == 1,69$$

$$\delta_h = \delta \sqrt{\frac{(\alpha - 1)}{\alpha}} = 17,84 \sqrt{\frac{(1,12 - 1)}{1,12}} = 5,83$$

$$\text{with } \alpha = \frac{388,7}{n \times \Sigma V_i} == 1,12$$

$$\delta_p = \delta \sqrt{\frac{1}{a} \times \left(\frac{\Sigma Fp_i}{\Sigma Ft_{i+\frac{277}{n}}}\right)} = 17,84 \sqrt{\frac{1}{1,12} \times \left(\frac{715,5}{3504 + \frac{277}{1,69}}\right)} = 7,45$$

Figure 7:
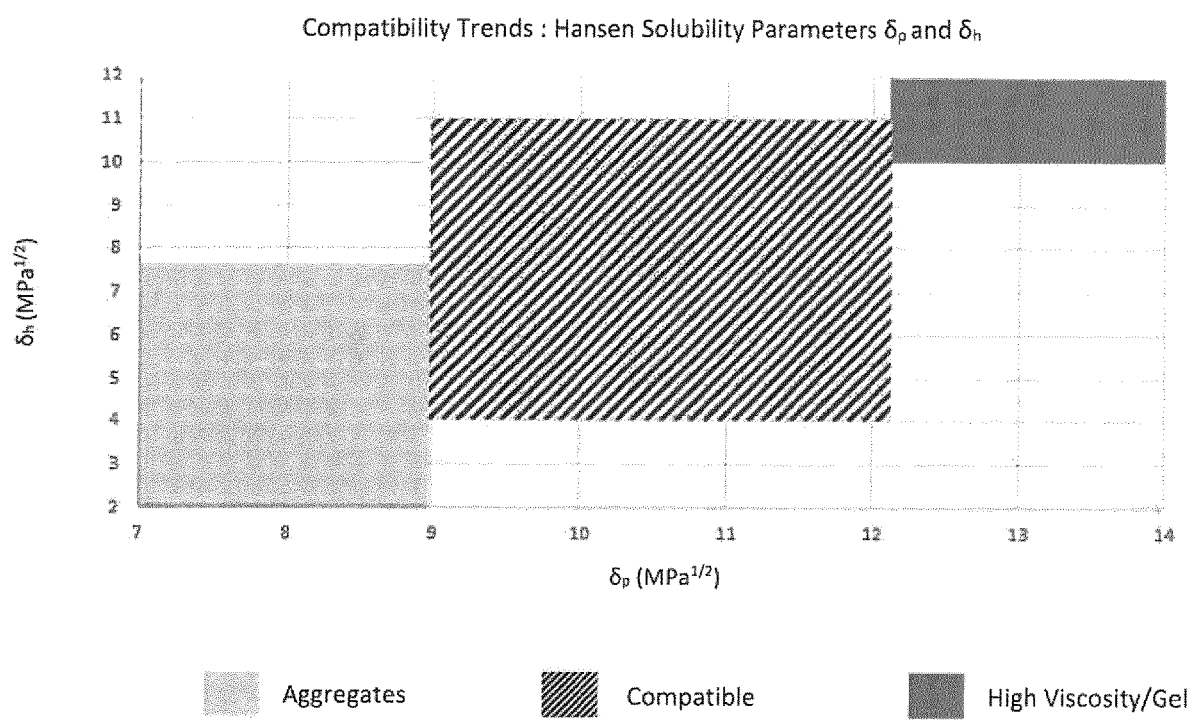

FIG. 7 demonstrates Hansen solubility parameters, $\delta_H$ vs $\delta_P$, trends for (meth)acrylate-functionalized compounds with the multistage polymer/(meth)acrylic polymer (P1) combination. Dispersing the multistage polymer/(meth) acrylic polymer (P1) combination in a component with solubility parameters falling in the black and gray shaded areas tend to yield gelation and aggregation issues respectively while utilizing components with parameters in the area marked with diagonal lines tend to yield stable dispersions. In FIG. 7, the compatible zone refers to both the clear and milky behaviors shown in FIG. 2. Table 4 outlines F1 Control and F2 Control formulation components' Hansen solubility parameters, rounded to the nearest tenth. All components have solubility parameters within the compatible zone of FIG. 7.

TABLE 4

| Component | $\delta_H$ | $\delta_P$ | $\delta_{tot}$ |
|---|---|---|---|
| CN996 | 10.6 | 9.9 | 21.5 |
| CN9071 | 9.7 | 12.1 | 21.8 |
| SR531 | 10.1 | 11.2 | 20.8 |
| SR238B | 6.4 | 10.6 | 19.8 |
| SR9035 | 8.8 | 10.5 | 21.0 |

Figure 8:
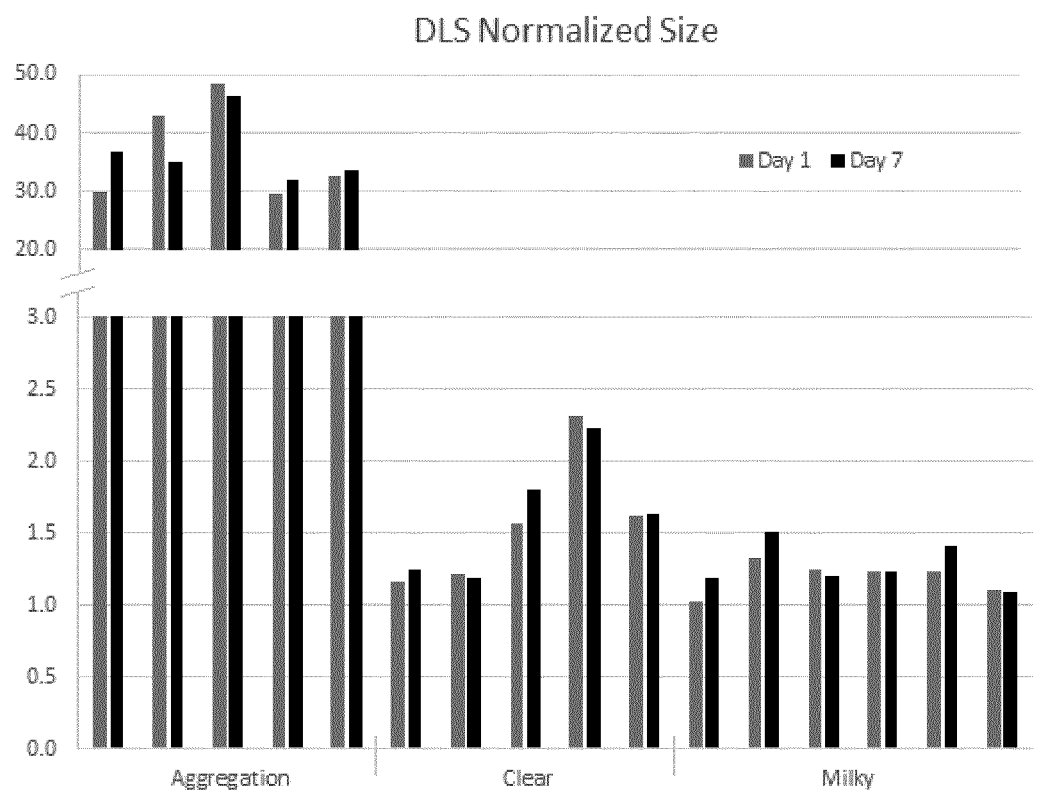

These trends determined by visual quality of samples is also supported by the multistage polymer particle size stability as measured by dynamic light scattering (DLS) as seen in FIG. 8. FIG. 8 depicts DLS normalized particle size values where values above 1 are likely due to aggregation or swelling of the multistage polymer. DLS measurements demonstrate that formulations with Hansen solubility parameters falling within the gray (aggregation) area on FIG. 7 have particle sizes much greater than that of the primary multistage polymer particle size (at least 20 times greater). The measured particle size of those within the area marked with diagonal lines in FIG. 7 are mostly within machine error of the theoretical primary multistage polymer particle size (normalized DLS values 1-1.5) except for some visibly clear samples. These clear samples can have up to three times the primary particle size measured by DLS which is most likely due to slight interactions between the (meth)acrylate-functionalized compound and the multistage polymer. Additionally, the gelled samples cannot be accurately measured by DLS to quantify particle size as gelation causes the multistage polymer to lose its physical integrity.

Example of Masterbatch with Concentrated Components (a)+(b) in (c)

Test Methods

Viscosity

The viscosity of the formulations is measured with a Brookfield viscometer at 23° C. and 20 rpm.

Curing Conditions

Photocurable formulations include 0.5-4 weight % on resin photoinitiator (typically TPO-L sold by Lambson or Irgacure 819 sold by BASF). These formulations are bulk cured under 12 W 395 nm LED lamps at approximately ten meters per minute exposing each side of the liquid containing silicone mold five times each. The photocured parts are often thermally post-cured at 120° C. for 2 hours to decrease any potential plasticizer effect from residual uncured material. Printed samples for DMA and impact analysis were fabricated by using an ANYCUBIC Photon 3D printer featuring LCD shadow masking manufacturing technique with an integrated LED light source at 405 nm. The layer thickness was set at 100 μm. The normal exposure time for each layer was 60 seconds with an off time of 6 seconds and the exposure time of the three bottom layers was 90 seconds. The printed samples are cleaned with Isopropanol and post-cured under 12 W 395 nm LED lamps at approximately ten meters per minute exposing each side five times.

Glass Transition Temperature

The glass transition temperatures (Tg) of the polymers are measured by thermomechanical analysis. Measurements were performed with a RDA III "Rheometrics Dynamic Analyser" provided by the Rheometrics Company. Polymer specimens (~5×2×40 mm³) were tested in torsion mode with a frequency of 1 Hz and strain of 0.05%. The temperature was increased from −100 to 200° C. with a heating rate of 3° C./min. The thermomechanical analysis measures precisely the visco-elastic changes of a sample as a function of the temperature, the strain or the deformation applied. The apparatus records continuously the sample deformation, keeping the strain fixed, during a controlled program of temperature variation. The results are obtained by drawing, as a function of the temperature, the elastic modulus (G', MPa), the loss modulus (G", MPa) and the tan delta. The Tg is the highest temperature value read in the tan delta curve, when the derivative of tan delta is equal to zero.

Impact Resistance

There are multiple standard tests to measure bulk impact resistance including Charpy and Izod impact testing. Izod and Charpy impact testing is conducted using a Zwick Roell HIT pendulum impact tester utilizing ASTM D256. Samples tested according to ASTM D256 may be notched or unnotched impact bars; the following results are notched Izod and unotched Charpy.

High loads of impact modifier additives (not in accordance with the present invention) in organic matrix increase drastically the impact resistance of the final cured material. However, dispersion issues and high viscosity increases due to such high loadings negatively impact the final properties and use of such formulations. Using a masterbatch with high concentration of multistage polymer (MSP)+(meth)acrylic polymer (P1) well dispersed in a small portion of polymerizing organic substance(s) eases the dilution in various polymerizing organic substances to reach a compromise between viscosity and impact resistance.

Using the Hansen solubility parameters, it was found that one polymerizing organic substance (polyethylene glycol di(meth)acrylate PEGDMA) has very stable compatibility with the combination of multistage polymer and (meth)acrylic polymer (P1). Thus the incorporation of a high concentration of multistage polymer+(meth)acrylic polymer (P1) was achieved and lead to good dispersions and workable viscosities as shown in Table 5. At 40 wt % of MSP+P1, the mixture is workable despite a high viscosity and was used as a masterbatch (MB) for further formulation.

TABLE 5

| MSP + P1 (wt %) | 40 | 36 | 32 | 28 | 24 | 20 | 16 | 12 | 8 | 4 | 0 |
|---|---|---|---|---|---|---|---|---|---|---|---|
| Viscosity at 23° C. (mPa·s) | 56000 | 15340 | 4640 | 1685 | 665 | 285 | 135 | 75 | 45 | 35 | 27 |

The masterbatch MB with 40 wt % of the combination of multistage polymer (MSP) and (meth)acrylic polymer (P1) was dispersed in various (meth)acrylate functionalized components that show two forms of stable dispersions (milky and clear). As seen in Table 6, the impact of the addition of impact modifier MSP+P1 on the viscosity is limited, The main advantages of using this masterbatch is a simplification of the formulation process and a limited increase of viscosity.

TABLE 6

| Dispersion aspect | Monomer (c) Name | MB (wt %) | | | | |
|---|---|---|---|---|---|---|
| | | 0 | 12.5 | 25 | 37.5 | 50 |
| Milky | TriethyleneGlycol Dimethacrylate | 8 | 14 | 27 | 61 | 153 |

TABLE 6-continued

| Dispersion aspect | Monomer (c) Name | MB (wt %) | | | | |
|---|---|---|---|---|---|---|
| | | 0 | 12.5 | 25 | 37.5 | 50 |
| | Cyclic Trimethylolpropane Formal Acrylate | 13 | 25 | 52 | 119 | 316 |
| Clear | Tricyclodecanedimethanol diacrylate | 140 | 190 | 272 | 465 | 1112 |
| | Ethoxylated Bisphenol A Dimethacrylate | 640 | 639 | 712 | 883 | 1337 |

Additional Examples of Curable Compositions

Incorporating the impact modifying additive of the present invention in polymerizing organic substances is proven to be easier by using a masterbatch. The viscosities shown in Table 8 illustrate the possibility of incorporating easily high load (28 wt %) of impact modifier in a Difunctional Urethane Aliphatic Methacrylate oligomer thanks to the use of the masterbatch MB (cf. Formulation F5 in Table 7).

Thermomechanical and impact testing were performed on bulk cured and 3D printed samples on formulations seen in Table 7. Two glass transitions are visible on DMA measurements. The negative glass transition temperature is attributed to the multistage polymer and more specifically to the polymer (A1) as described in the present invention. An improvement of the impact resistance without hurting other mechanical properties is demonstrated with the incorporation of 14 to 28 wt % of MSP+P1.

As seen in Table 8, an improvement of impact resistance with the presence of impact modifier is demonstrated.

TABLE 7

| Components | Formulations | | |
|---|---|---|---|
| | F3 weight % | F4 weight % | F5 weight % |
| Blend of MSP + P1 at 40 wt % in PEGDMA | 0 | 35 | 70 |
| PEGDMA | 70 | 35 | 0 |
| Difunctional Urethane Aliphatic Methacrylate Oligomer | 30 | 30 | 30 |

TABLE 8

| Tested Formulations | MSP + P1 (wt %) | Viscosity at 23° C. (mPa · s) | Curing conditions | $T_{g1}$ (° C.) | $T_{g2}$ (° C.) | G' at 23° C. (Pa) | G' at 180° C. (Pa) | IZOD Notched Impact Resistance (J/m) | Charpy Unotched Impact resistance (kJ/m²) |
|---|---|---|---|---|---|---|---|---|---|
| Oligomer | 0 | 10 000 | Bulk | — | 140 | 1.1E+9 | 2.7E+7 | | 14 ± 4 |
| PEGDMA | 0 | 16 | | — | 107 | 6.0E+8 | 7.1e+7 | | 12 ± 7 |
| MB | 40 | 56 000 | | −67 | 101 | 3.2E+8 | 1.4E+7 | | — |
| F3 | 0 | 57 | | — | 120 | 8.3E+8 | 4.9E+7 | 19 ± 4 | 19 ± 4 |
| F4 | 14 | 330 | | −70 | 110 | 7.5E+8 | 4.2E+7 | 27 ± 5 | 25 ± 4 |
| F5 | 28 | 6400 | | −69 | 110 | 6.8E+8 | 1.5E+7 | 29 ± 5 | 42 ± 2 |
| F3 | — | 57 | Printed | — | 120 | 8.3E+8 | 6.4E+7 | 11 ± 0.6 | 20 ± 4 |
| F5 | 28 | 6400 | | −69 | 102 | 5.6E+8 | 2.2E+7 | 21 ± 0.8 | 31 ± 6 |

The invention claimed is:

1. A curable composition comprising component (a), component (b), component (c), and optionally component (d), wherein:
   a) component (a) is one or more multistage polymers;
   b) component (b) is one or more (meth)acrylic polymers (P1), which is or are the same or different in composition from any (meth)acrylic polymer present as part of the multistage polymer(s) of component (a);
   c) component (c) is one or more polymerizing organic substances selected from the group consisting of tetrahydrofurfuryl methacrylate, cyclic trimethylolpropane formal acrylate, methoxy polyethylene glycol monomethacrylates containing on average from about 6 to about 15 ethylene oxide units, polyethylene glycol dimethacrylates containing from about 3 to about 7 ethylene oxide units, 1,4-butanediol dimethacrylate, trimethylolpropane trimethacrylate, ethoxylated pentaerythritol tetraacrylates containing from about 2 to about 6 ethylene oxide units, hydroxypropyl methacrylate, ethoxylated bisphenol A dimethacrylates containing from about 1 to about 12 ethylene oxide units, tricyclodecanemethanol acrylate, dicyclodecane dimethananol diacrylate, (meth)acrylate-functionalized urethane oligomers and combinations thereof; and
   d) optional component (d) is one or more photoinitiators.

2. The curable composition of claim 1, wherein component (a) includes at least one multistage polymer selected from the group consisting of:
   i) multistage polymers comprising:
      A) an (A) stage polymer comprising a polymer (A1) having a glass transition temperature of less than 0° C.; and
      B) a (B) stage polymer comprising a polymer (B1) having a glass transition temperature of at least 30° C.; and
   ii) multistage polymers comprising:
      A) an (A) stage polymer comprising a polymer (A1) having a glass transition temperature of less than 10° C.;
      B) a (B) stage polymer comprising a polymer (B1) having a glass transition temperature of at least 60° C.; and
      C) a (C) stage polymer comprising a polymer (C1) having a glass transition temperature of at least 30° C., wherein the (C) stage polymer may provide at least a part of component (b).

3. The curable composition according to claim 2, wherein the (A) stage polymer is grafted onto the (B) stage polymer.

4. The curable composition according to claim 2, wherein polymers (A1) and (B1) are (meth)acrylic polymers which have compositions which are different from that of (meth)acrylic polymer(s) (P1).

5. The curable composition according to claim 1, wherein the one or more (meth)acrylic polymers (P1) are soluble at 25° C. in component (c).

6. The curable composition according to claim 1, wherein the one or more (meth)acrylic polymers (P1) comprise at least 50 wt % methyl methacrylate.

7. The curable composition according to claim 1, wherein component (b) has a glass transition temperature of at least 30° ° C.

8. The curable composition according to claim 2, wherein polymer (A1) is a polyorganosiloxane or comprises at least 50 wt % of polymeric units coming from isoprene or butadiene.

9. The curable composition according to claim 1, wherein the one or more (meth)acrylic polymers (P1) of component (b) are not grafted on the one or more multistage polymers of component (a).

10. The curable composition of claim 1, wherein component (c) has a Hansen solubility parameter $\delta_{tot}$ of from 18.7 $\text{MPa}^{1/2}$ to 21.9 $\text{MPa}^{1/2}$ at 25° C.

11. The curable composition of claim 1, wherein component (c) has at least one of a $\delta_p$ value of from 9 $\text{MPa}^{1/2}$ to 13 $\text{MPa}^{1/2}$ at 25° C., a $\delta_h$ value of from 4 $\text{MPa}^{1/2}$ to 11 $\text{MPa}^{1/2}$ at 25° C., or a $\delta_d$ value of 12.9 $\text{MPa}^{1/2}$ to 16.9 $\text{MPa}^{1/2}$ at 25° C.

12. A curable composition comprising component (a), component (b), component (c), and optionally component (d), wherein:
   a) component (a) is one or more multistage polymers;
   b) component (b) is one or more (meth)acrylic polymers (P1), which is or are the same or different in composition from any (meth)acrylic polymer present as part of the multistage polymer(s) of component (a);
   c) component (c) is one or more polymerizing organic substances comprising at least one polymerizing flexibilizer selected from the group consisting of (meth)acrylate-functionalized urethane oligomers, (meth)acrylate-functionalized polyester oligomers, (meth)acrylate-functionalized polyether oligomers, epoxy-functionalized oligomers and combinations thereof;
   d) optional component (d) is one or more photoinitiators.

13. The curable composition of claim 1, wherein component (d) includes at least one photoinitiator selected from the group consisting of free radical photoinitiators, cationic photoinitiators and combinations thereof.

14. The curable composition of claim 1, additionally comprising at least one additive selected from the group consisting of stabilizers, light blockers, pigments and dyes.

15. The curable composition of claim 1, comprising 0.5 to 25 wt % component (a), 5 to 80 wt % component (b), 10 to 95 wt % component (c), and 0.1 to 10 wt % component (d), wherein the sum of weights of (a), (b), (c) and (d) equals 100% in total.

16. The curable composition of 1, wherein the composition has a content of component (a) of at least 10 wt % and a viscosity at 25° C. of not greater than 10,000 mPa·s (cP).

17. A masterbatch which is useful for preparing a curable composition in accordance with claim 1, wherein the masterbatch comprises the components (a), (b) and (c) but has a higher concentration of component (a)+component (b) (sum of (a)+(b)) than the curable composition to be prepared from said masterbatch by further dilution with at least one component (c).

18. A method of making a curable composition in accordance with claim 1, comprising combining a masterbatch with at least a quantity of component (c), wherein the masterbatch has a higher concentration of component (a) and component (b) than the curable composition to be prepared from the masterbatch.

* * * * *